(12) United States Patent
Naito et al.

(10) Patent No.: US 6,594,992 B1
(45) Date of Patent: Jul. 22, 2003

(54) PUNCH PRESS HYDRAULIC SERVO DEVICE USING A ROTARY VALVE

(75) Inventors: Kinshiro Naito, 318-3, Ishida, Isehara-shi, Kanagawa 259-1116 (JP); Masayuki Shimizu, Kanagawa (JP); Hideo Hara, Tokyo (JP); Osamu Takahashi, Kanagawa (JP)

(73) Assignees: Amada Engineering Center Company, Limited, Kanagawa (JP); Kinshiro Naito, Kanagawa (JP); Amada Company, Limited, Kanagawa (JP)

( * ) Notice: Subject to any disclaimer, the term of this patent is extended or adjusted under 35 U.S.C. 154(b) by 0 days.

(21) Appl. No.: 09/806,328
(22) PCT Filed: Aug. 31, 1999
(86) PCT No.: PCT/JP99/04716
§ 371 (c)(1), (2), (4) Date: Mar. 29, 2001
(87) PCT Pub. No.: WO00/61950
PCT Pub. Date: Oct. 19, 2000

(30) Foreign Application Priority Data

Apr. 14, 1999 (JP) ............................................. 11/107134
May 13, 1999 (JP) ............................................. 11/133240

(51) Int. Cl.⁷ ........................ F15B 13/044; F16K 11/078
(52) U.S. Cl. ........................ 60/430; 60/486; 137/625.17
(58) Field of Search ........................ 60/429, 430, 486; 137/625.17, 636.4, 637.4

(56) References Cited

U.S. PATENT DOCUMENTS

| | | | |
|---|---|---|---|
| 2,976,878 A | 3/1961 | Smilges | |
| 3,213,881 A | 10/1965 | Findlay et al. | |
| 3,269,412 A | * 8/1966 | Badke | 137/625.17 |
| 3,982,417 A | 9/1976 | Cailloux | |
| 4,058,140 A | * 11/1977 | Budzich | 137/596.1 |

FOREIGN PATENT DOCUMENTS

| | | |
|---|---|---|
| DE | 1-301-960 | 7/1966 |
| FR | 2.214.362 | 8/1974 |
| JP | 51119478 | * 10/1976 |
| JP | 5720240 B2 | * 4/1982 |
| JP | 5913406 Y2 | * 4/1984 |
| JP | 1094900 A | * 4/1998 |

* cited by examiner

Primary Examiner—Edward K. Look
Assistant Examiner—Thomas E. Lazo
(74) Attorney, Agent, or Firm—Blank Rome LLP

(57) ABSTRACT

In a rotary servo valve (1) provided with at least two kinds of pump port (33, 39) for high and low pressures, a spool (11) that is free to rotate and free to reciprocate linearly is installed into a spool guide hole (7) of the valve main body (9), a servo motor (15) that rotates and drives the spool and a linear type actuator (13) that reciprocatedly travels are disposed, and the pump ports are selectively changed over by the reciprocation of the spool, and cylinder ports are selectively changed over by the rotation and at the same time the flow rate is controlled.

12 Claims, 13 Drawing Sheets

OPENING SECTION : CLOSED
FLOW RATE INSIDE THE SPOOL : 0

OPENING SECTION : SLIGHTLY OPEN
FLOW RATE INSIDE THE SPOOL : A LITTLE

OPENING SECTION : FURTHER OPEN
FLOW RATE INSIDE THE SPOOL : INCREASED

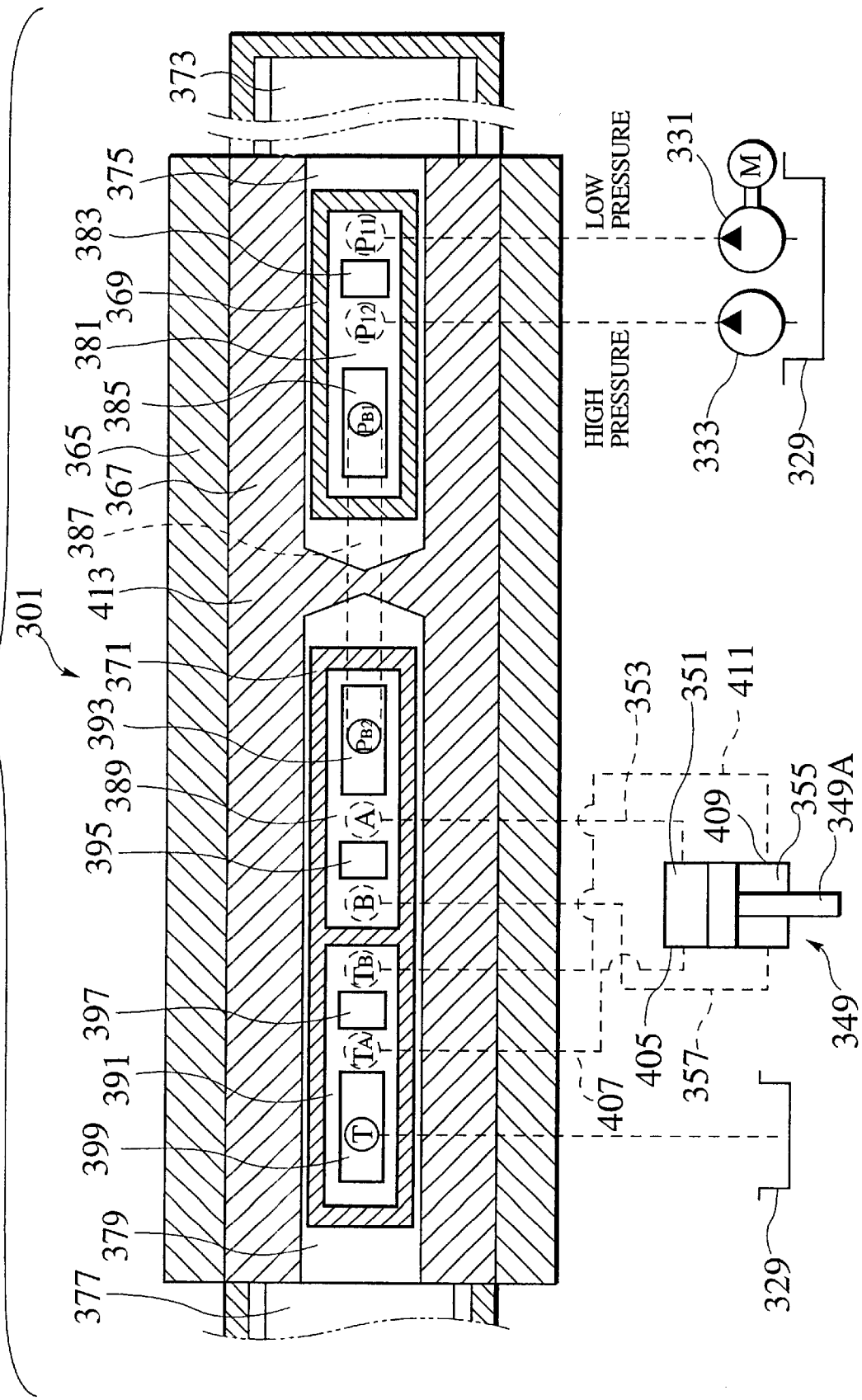

PUNCH PRESS HYDRAULIC SERVO DEVICE USING A ROTARY VALVE

TECHNICAL FIELD

The present invention relates to a rotary servo valve that carries out flow rate control and pressure control in the hydraulic circuit of each industrial machinery and punch press liquid operated servo system using the same valve.

BACKGROUND ART

To the liquid operated servo system in conventional technological field of hydraulic control type machine tools and industrial machinery, directly driven type servo valves or electromagnetic proportional control servo valves, and other control valves are popularly used.

For example, in hydraulically driven punch presses, the elevating stroke of hydraulic cylinder ram is controlled in four patterns of quick approach stroke, low-speed punching stroke, high-speed descending stroke at the time of chip shaking off, and quick return stroke in order to achieve low noise and low vibration.

In order to control the strokes of the above-mentioned four patterns, as depicted in the hydraulic circuit shown in FIG. 1, a high pressure hydraulic pump 207 and low pressure hydraulic pump 209 are installed via the suction filter 205 from the oil tank 203 in order to operate the hydraulic cylinder 201. The high pressure pipe conduit 211 and the low pressure pipe conduit 213 on the discharge ends of the high pressure hydraulic pump 207 and the low pressure hydraulic pump 209 are connected to high-low pressure selector valve 215, and the discharge end of this high-low pressure selector valve 215 is connected to the upper oil chamber 219 and the lower oil chamber 221 of the hydraulic cylinder 201 via the upper-lower selector valve 217.

In the midway of the high-pressure pipe conduit 211 and the low-pressure pipe conduit 213, high-pressure accumulator 223, low-pressure accumulator 225, and other control valves are installed.

In the above-mentioned hydraulic circuit, low-pressure high-flow rate hydraulic fluid is controlled to be supplied to the hydraulic cylinder 201 in the quick approach, quick return, and chip shake-off strokes, and the high-pressure small-flow rate hydraulic fluid to be supplied in the punching stroke.

Now, in the above-mentioned conventional control system, a high-low pressure selector valve 215 is required for changing over high and low hydraulic pressures to operate the hydraulic cylinder 201, and the upper-lower selector valve 217 is required for changing over the top and the bottom of the hydraulic cylinder 201. In this way, one or more control valves are required for one circuit, and the circuit increases the complexity. Consequently, there is a problem in that the particularly subtle control is difficult.

In addition, a space for installing a plurality of valves 215, 217 is required, causing a problem of preventing size reduction of the system, and an increase of valves 215, 217 tends to increase the risk of oil leak, and causes a problem of energy loss.

Furthermore, hydraulic piping and electrical wiring for operating valves 215, 217 are required, respectively, causing a problem of increased complexity of the system.

The hydraulic manifold to which the two servo valves (215, 217) are installed requires a hydraulic circuit of two systems of high pressure and low pressure and a two-way circuit of rise and descend, making the hydraulic manifold circuit extremely complicated and resulting in a large profile, interfering the system from reducing the size.

In the directly operated servo valve or electromagnetic proportional servo valve, a method for detecting displacement of the built-in spool with a differential transformer and feeding back of the detected result to the spool displacement instruction signals is used. However, because the differential transformer adopts a detection principle using coils, the detection displacement is shifted (temperature is drifted) by the ambient air temperature, and detection errors are generated, making it difficult to achieve high-accuracy spool position control.

Because in the valve manufacturing process, there is an individual difference between processing sizes of the valve main body and the spool of the servo valve, a difference is generated in the opening initiation position of the hydraulic fluid supply port as well as the relation between the spool displacement rate and the supply flow rate, and in the conventional liquid operated servo system with two servo valves combined, there is a problem of different flow rate characteristics for each servo system. In addition, when two servo valves are combined, the oil passage connecting the two servo valves becomes long and the response speed of the valve to the control instructions becomes slow.

DISCLOSURE OF THE INVENTION

Accordingly, the present invention has been made to solve the problems as described above, and it is an object of the present invention to provide a compact and high-accuracy rotary servo valve equipped with both supply fluid selector capabilities and the flow rate control capabilities as well as the punch press liquid operated servo system using the said valve.

To achieve the above object, a rotary servo valve according to the first aspect comprises a valve main body provided with a plurality of intake ports for taking in a plurality of pressure fluids which have pressures different to one another and a plurality of supply ports for supplying a plurality of pressure fluids taken in to the desired drives; a spool which is installed free to reciprocate along a sliding groove formed in the valve main body while being free to rotate around the longitudinal direction of the sliding groove and which allows one of the plurality of intake ports to selectively communicate with one of the plurality of supply ports; reciprocatedly moving mechanisms for reciprocating the spool along the sliding groove without rotating; and rotating mechanisms for rotating the spool along the sliding groove without reciprocating.

The rotary servo valve according to the second aspect is a rotary servo valve according to the first aspect, wherein the plurality of intake ports includes a high-pressure opening for taking in high-pressure fluid and a low-pressure opening for taking in low-pressure fluid, and the plurality of supply ports includes a descent port for supplying pressure fluid to the upper chamber of the cylinder operated by the pressure fluid and a rise port for supplying pressure fluid to the lower chamber of the cylinder.

The rotary servo valve according to the third aspect is a rotary servo valve according to the first aspect, wherein one of the plurality of intake ports is selected by the reciprocating motion of the spool and one of the plurality of supply ports is selected by the rotating motion of the spool.

The rotary servo valve according to the fourth aspect is a rotary servo valve according to the first aspect, wherein one of the plurality of supply ports is selected by the reciprocating motion of the spool and one of the plurality of intake ports is selected by the rotating motion of the spool.

The rotary servo valve according to the fifth aspect is a rotary servo valve according to the first aspect, further comprising a means for detecting a rotation angle of the spool.

The rotary servo valve according to the sixth aspect is a rotary servo valve according to the fifth aspect, wherein the means for detecting the rotation angle is a rotary encoder.

To achieve the above object, a punch press hydraulic servo system according to the seventh aspect comprises a plurality of pressure sources for supplying a plurality of pressure fluids with pressures different from one another; a punch press hydraulic cylinder; a valve main body provided with a plurality of intake ports for taking in a plurality of pressure fluids and a plurality of supply ports for supplying the plurality of pressure fluids taken in to an upper chamber or a lower chamber of a hydraulic cylinder; a spool which is installed free to reciprocate along a sliding groove equipped to the valve main body while being free to rotate around the longitudinal direction of the sliding groove and which allows one of the plurality of intake ports to selectively communicate with one of the plurality of supply ports; and control means for independently controlling the reciprocating motion and the rotating motion of the spool, wherein by the control of the control means for the spool, one of the plurality of intake ports and one of the plurality of supply ports are selected to supply pressure fluid having a desired pressure to either the upper chamber or the lower chamber of the hydraulic cylinder, and at the same time, the rotating motion of the spool is subtly adjusted to adjust a flow rate of the pressure fluid supplied to the upper chamber or the lower chamber of the hydraulic cylinder, and thereby driving speed and power of the piston of the hydraulic cylinder are controlled.

The punch press hydraulic servo system according to the eighth aspect is a punch press hydraulic servo system according to the seventh aspect, further comprising a means for detecting a rotation angle of the spool.

The punch press hydraulic servo system according to the ninth aspect is a punch press hydraulic servo system according to the eighth aspect, wherein the means for detecting the rotation angle is a rotary encoder.

To achieve the above object, a rotary servo valve according to the tenth aspect comprises a valve main body provided with a plurality of intake ports for taking in a plurality of pressure fluids which have pressures different to one another and a plurality of supply ports for supplying a plurality of pressure fluids taken in to the desired drives; a first rotating spool that has a hollow, and is installed to be inserted into the valve main body while being free to rotate, and selectively allows one of the plurality of intake ports to communicate with the hollow; a first rotating actuator for rotating the first rotating spool; a second rotating spool that has a hollow, and is installed to be inserted into the valve main body while being free to rotate, and selectively allows one of the plurality of supply ports to communicate with the hollow; and a second rotating actuator for rotating the second rotating spool, wherein the valve main body has a connection passage that interconnects pressure fluids in the hollows of the first and the second rotating spools.

The rotary servo valve according to eleventh aspect is a rotary servo valve according to the tenth aspect, wherein the plurality of intake ports includes a high-pressure opening for taking in high-pressure fluid and a low-pressure opening for taking in low-pressure fluid, and the plurality of supply ports includes a descent port for supplying pressure fluid to the upper chamber of the cylinder operated by the pressure fluid and a rise port for supplying pressure fluid to the lower chamber of the cylinder.

The rotary servo valve according to twelfth aspect is a rotary servo valve according to the tenth aspect, wherein a hollow wall of the first rotating spool is provided with a first opening section that is allowed to selectively communicate with the plurality of intake ports and a second opening section that communicates with the connection passage of the valve main body, and the second rotating spool is provided with a hollow pressure fluid flow-in chamber and a pressure fluid discharge chamber, and the pressure fluid flow-in chamber is provided with a third opening section that communicates with the connection passage and a fourth opening section that is allowed to selectively communicate with a descent port and a rise port that respectively communicates with the upper chamber and the lower chamber of the cylinder, and the pressure fluid discharge chamber is provided with a fifth opening section that is allowed to selectively communicate with a discharge-side descent port and a discharge-side rise port that respectively communicates with the descent port and the rise port through first and second connection passages and a sixth opening section that communicates with an oil drain port that connects to an oil tank.

The rotary servo valve according to the thirteenth aspect is a rotary servo valve according to the tenth aspect, wherein a hollow wall of the first rotating spool is provided with a first opening section that is allowed to selectively communicate with the plurality of intake ports and a second opening section that communicates with the connection passage of the valve main body, and the second rotating spool is provided with a hollow pressure fluid flow-in chamber and a pressure fluid discharge chamber, and the pressure fluid flow-in chamber is provided with a third opening section that communicates with the connection passage and a fourth opening section that is allowed to selectively communicate with a descent port and a rise port that respectively communicates with the upper chamber and the lower chamber of the cylinder, and the pressure fluid discharge chamber is provided with a fifth opening section that is allowed to selectively communicate with a discharge-side descent port and a discharge-side rise port that respectively communicates with a lower oil drain port and an upper oil drain port that are respectively located at the upper chamber and the lower chamber of the cylinder, and a sixth opening section that communicates with an oil drain port that connects to an oil tank.

To achieve the above object, a rotary servo valve according to the fourteenth aspect comprises a valve main body provided with a plurality of intake ports for taking in a plurality of pressure fluids which have pressures different to one another and a plurality of supply ports for supplying a plurality of pressure fluids taken in to the desired drives; a first sliding spool that has a hollow, and is installed to be inserted into the valve main body while being free to reciprocate, and selectively allows one of the plurality of intake ports to communicate with the hollow; a first sliding actuator for sliding the first sliding spool; a second sliding spool that has a hollow, and is installed to be inserted into the valve main body while being free to reciprocate, and selectively allows one of the plurality of supply ports to communicate with the hollow; and a second sliding actuator for sliding the second sliding spool, wherein the valve main body has a connection passage that interconnects pressure fluids in the hollows of the first and the second sliding spools.

The rotary servo valve according to the fifteenth aspect is a rotary servo valve according to the fourteenth aspect, wherein the plurality of intake ports includes a high-pressure openings for taking in high-pressure fluid and low-pressure openings for taking in low-pressure fluid, and the plurality of supply ports includes a descent port for supplying pressure fluid to the upper chamber of the cylinder operated by the pressure fluid and a rise port for supplying pressure fluid to the lower chamber of the cylinder.

The rotary servo valve according to the sixteenth aspect is a rotary servo valve according to the fourteenth aspect, wherein a hollow wall of the first sliding spool is provided with a first opening section that is allowed to selectively communicate with the plurality of intake ports and a second opening section that communicates with the connection passage of the valve main body, and the second sliding spool is provided with a hollow pressure fluid flow-in chamber and a pressure fluid discharge chamber, and the pressure fluid flow-in chamber is provided with a third opening section that communicates with the connection passage and a fourth opening section that is allowed to selectively communicate with a descent port and a rise port that respectively communicates with the upper chamber and the lower chamber of the cylinder, and the pressure fluid discharge chamber is provided with a fifth opening section that is allowed to selectively communicate with a discharge-side descent port and a discharge-side rise port that respectively communicates with the descent port and the rise port through first and second connection passages and a sixth opening section that communicates with an oil drain port that connects to an oil tank.

The rotary servo valve according to the seventeenth aspect is a rotary servo valve according to the fourteenth aspect, wherein a hollow wall of the first sliding spool is provided with a first opening section that is allowed to selectively communicate with the plurality of intake ports and a second opening section that communicates with the connection passage of the valve main body, and the second sliding spool is provided with a hollow pressure fluid flow-in chamber and a pressure fluid discharge chamber, and the pressure fluid flow-in chamber is provided with a third opening section that communicates with the connection passage and a fourth opening section that is allowed to selectively communicate with a descent port and a rise port that respectively communicates with the upper chamber and the lower chamber of the cylinder, and the pressure fluid discharge chamber is provided with a fifth opening section that is allowed to selectively communicate with a discharge-side lowering port and a discharge-side rise port that respectively communicates with a lower oil drain port and an upper oil drain port that are respectively located at the upper chamber and the lower chamber of the cylinder, and a sixth opening section that communicates with an oil drain port that connects to an oil tank.

BRIEF DESCRIPTION OF THE DRAWINGS

FIG. 18 is a cross-sectional view of the fifth embodiment of the rotary servo valve related to the present invention.

BEST MODE FOR CARRYING OUT THE INVENTION

Now, the specific configurations of the present invention will be described in detail thereafter.

Figure 1:
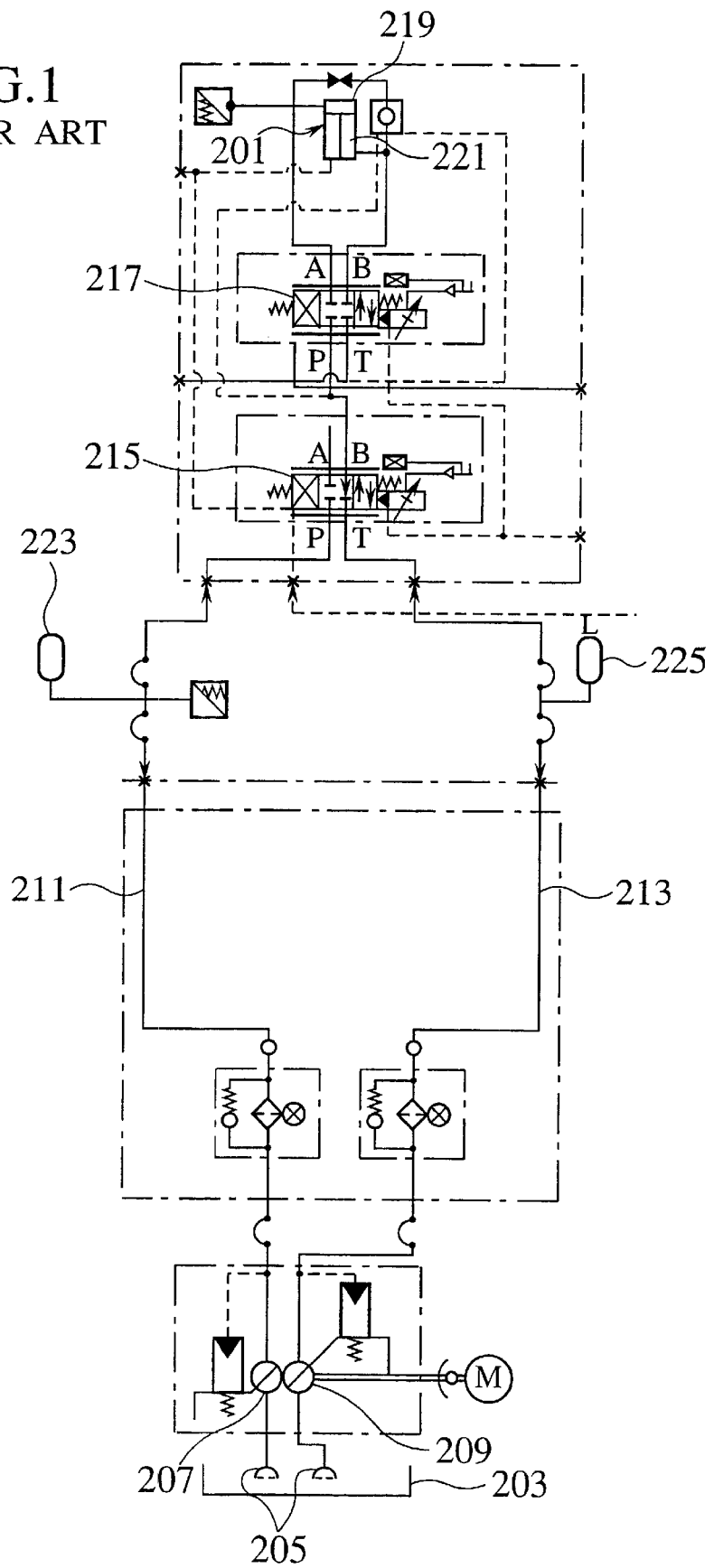
FIG. 1 is a circuit diagram of a conventional hydraulic servo system in a hydraulically driven punch press.
Figure 2:
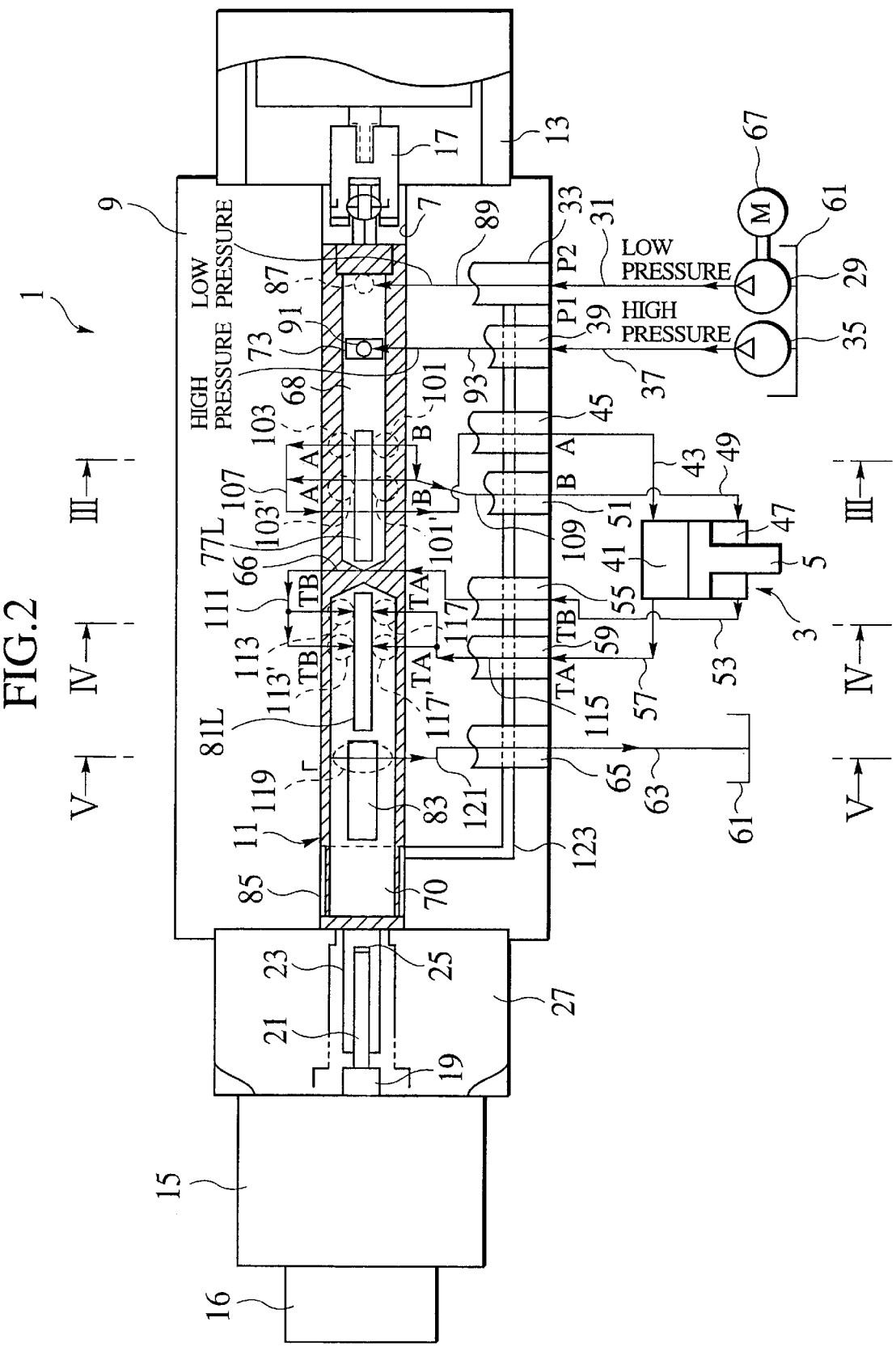
FIG. 2 is a cross-sectional view of the first embodiment of the rotary servo valve related to the present invention.

FIG. 2 is an explanatory illustration giving an example of the case in which the piston 5 of the hydraulic cylinder 3 is moved vertically at high or low pressure by the rotary servo valve related to the present invention. Referring now to FIG. 2, the rotary servo valve 1 has a spool 11 which is free to rotate and slide in a spool guide hole 7 disposed to the valve main body 9 equipped with the spool guide hole 7.

A linear type actuator 13 such as an electromagnetic solenoid and a linear motor is provided as a reciprocatedly moving mechanism for moving the spool 11 along the spool guide hole 7. A serve motor 15 such as an AC servo motor, a DC servo motor and a pulse motor is provided as rotating mechanism for rotating the spool 11. An optical rotary encoder 16 is provided for detecting the rotation angle of the spool 11.

The rotary encoder 16 is also used for vector control of the servo motor 15 itself and feedback of the rotation angle. In addition, for the rotation angle detector, a magnetic rotation detector, resolver, etc. may be used.

The linear type actuator 13 is installed to the right end face of the valve main body 9 (in FIG. 2), and is connected by a bearing 17 that allows for rotation only, in order to allow the spool 11 to be pushed or pulled in the horizontal direction while to allow it to rotate.

On the other hand, the servo motor 15 is mounted to the left end face of the valve main body 9 via a block 27. The spline shaft 21 mounted to the rotating shaft 19 of the servo motor 15 is inserted in a spline hole 25 formed to the protrusion 23 provided protrudably from the spool 11 to the left end face.

Consequently, the servo motor 15 transmits rotation while allowing the spool 11 to make the horizontal reciprocating motion.

On the side surface (bottom surface in FIG. 2) of the valve main body 9, a low-pressure pump port 33 as a intake port connected to the low-pressure pump 29 for supplying low-pressure fluid by the pipe conduit 31, a high-pressure pump port 39 as a intake port connected to the high-pressure pump 35 for supplying high-pressure fluid by the pipe conduit 37, an A-port hole 45 as a supply port connected by the pipe conduit 43 for supplying pressure fluid to the upper chamber 41 of the hydraulic cylinder 3, a B-port hole 51 as a supply port connected by the pipe conduit 49 for supplying pressure fluid to the lower chamber 47 of the hydraulic cylinder 3, a TB-port hole 55 as a cylinder port connected by the pipe conduit 53 for discharging the pressure fluid from the lower chamber 47 of the hydraulic cylinder, a TA-port hole 59 connected by the pipe conduit 57 for discharging pressure fluid from the upper chamber 41 of the hydraulic cylinder 3, and a T-port hole 65 connected to the oil tank 61 by the pipe conduit 63 in order to return the pressure fluid discharged from the hydraulic cylinder 3 to the oil tank 61 are provided.

To the oil tank 61, a high-pressure pump 35 and a low-pressure pump 29 which are driven by the motor 67 are disposed. The high-pressure pump 35 is connected to the high-pressure pump port 39 of the rotary servo valve 1 by a high-pressure circuit (detailed circuit diagram is not illustrated), and the low-pressure pump 29 is connected to the low-pressure pump port 33 of the rotary servo valve 1 by a low-pressure circuit (detailed circuit diagram is not illustrated).

To the spool 11, the first oil chamber 68 that contains high-pressure or low-pressure oil is installed on the linear type actuator 13 side and the second oil chamber 70 that contains nearly atmospheric pressure discharge oil is installed on the left servo motor 15 side with the bulkhead 66 installed nearly at the center in-between.

The first oil chamber 68 is provided with a pair of top and bottom opposing rectangular pressure oil supply holes 73 (in FIG. 2, the bottom hole only is shown) and a pair of top and bottom elongated rectangular notches 77U, 77L. The notches 77U, 77L also play a role to smoothly reciprocate and rotate the spool by pressure balance inside the valve.

Figure 4:
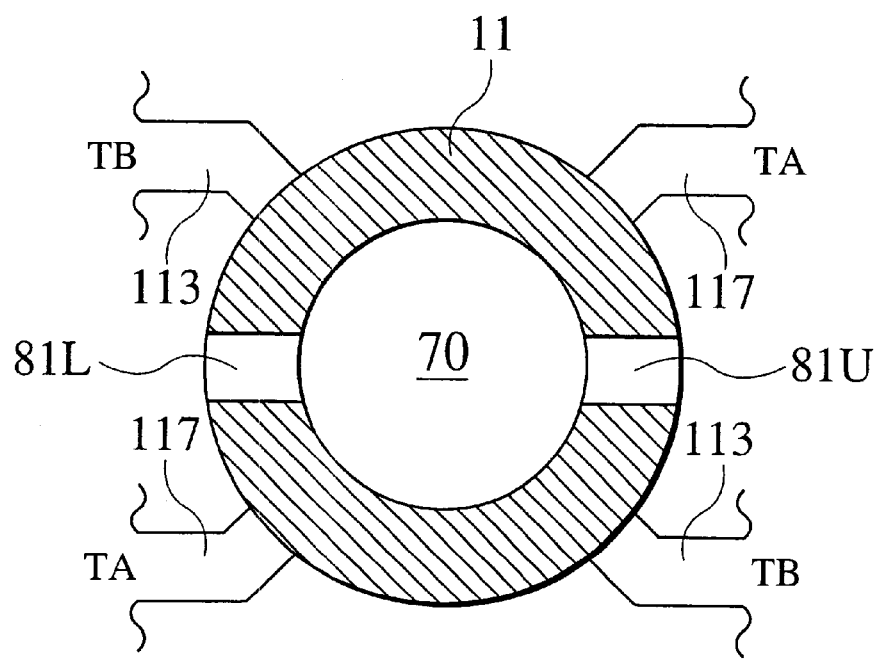
FIG. 4 is a cross-sectional view taken on line IV—IV of FIG. 2.
Figure 5:
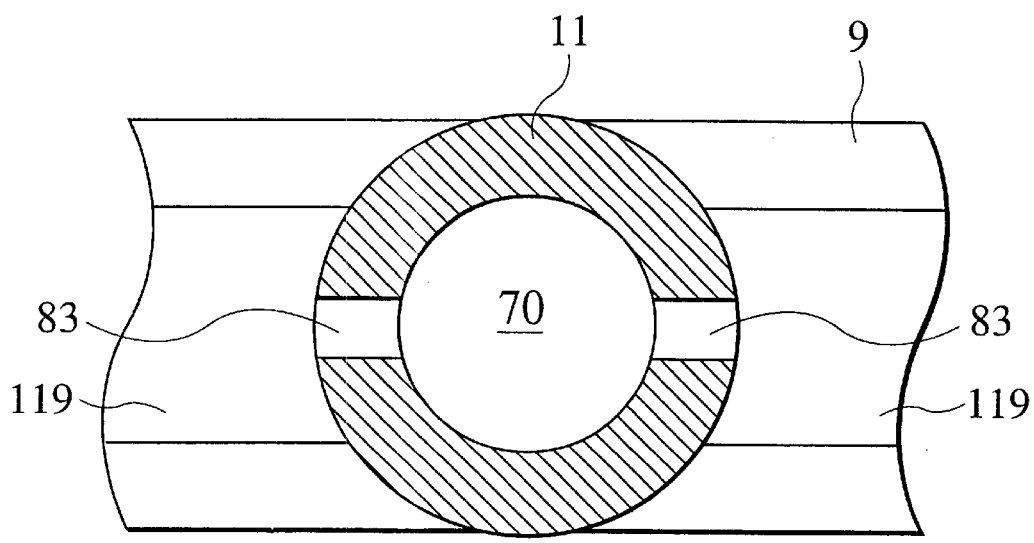
FIG. 5 is a cross-sectional view taken on line V—V of FIG. 2.

In addition, the second oil chamber 70 is provided with a pair of top and bottom elongated rectangular notches 81U, 81L, with an elongated wide notch 83 on the left of the notches 81U, 81L (see FIG. 4 and FIG. 5).

The notches 77U, 77L, 81U, 81L, 83 are provided in such a length that they are able to be in free communication with port holes later described even when the spool 11 moves horizontally by the linear type actuator 13. On the outer circumference of the left-side end of the spool 11, a large number of grooves 85 are provided, and pressure oil is fed to grooves 85 by the bypass port 123 from the low-pressure port hole 33 or high-pressure pump port 39, etc., and oil film is formed between the spool guide hole 7 and the spool 11 to prevent seizure between the spool guide hole 7 and the spool 11.

Referring now to FIG. 2 again, inside the valve main body 9, various oil passages are formed. A low-pressure opening 87 is provided on the bottom side of the spool guiding hole 7 that corresponds to the position of the pressure oil supply hole 73 on the lower side when the spool 11 is moved to the right side by the linear type actuator 13, and an oil passage 89 is formed for free communication of this low pressure opening 87 with the low-pressure pump port 33.

The pressure oil supply hole 73 of the spool 11 is formed in such a size that it is not deviated from the low-pressure opening 87 even when the spool 11 is rotated by a specified angle. In addition, a high-pressure opening 91 is installed on the lower side of the spool guiding hole 7 that corresponds to the above-mentioned lower position when the spool 11 is moved to the left side by the linear type actuator 13 (condition of FIG. 2), and an oil passage 93 is formed for free communication of this high pressure opening 91 with the high-pressure pump port 39.

The pressure oil supply hole 73 of the spool 11 is formed in such a size that it is not deviated from the high-pressure opening 91 even when the spool 11 is rotated by a specified angle as in the case of the low-pressure opening 87.

When the spool 11 is moved to the right side, low-pressure oil flows into the first oil chamber 68 of the spool 11 via the low-pressure pump 29, pipe conduit 31, low-pressure pump port 33, oil passage 89, low-pressure opening 87, and pressure oil supply hole 73. In addition, when the spool 11 is moved to the left side position, high-pressure oil also flows into the first oil chamber 68 of the spool 11 via the high-pressure pump 35, pipe conduit 37, high-pressure pump port 39, oil passage 93, high-pressure opening 91, and pressure oil supply port 73.

Figure 3:
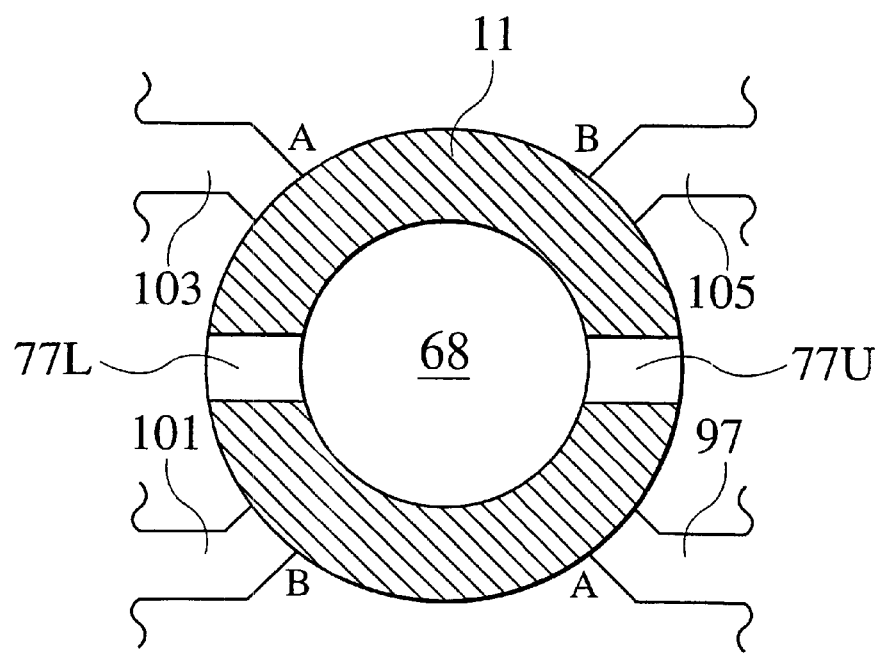
FIG. 3 is a cross-sectional view taken on line III—III of FIG. 2.

As shown in FIG. 3, to the valve main body 9, A-port outlets 97 and 103 as well as port B outlets 101 and 105 are oppositely installed as cylinder ports. The A-port outlets 97 and 103 become one inside the valve main body 9, and is in communication with the A-port hole 45 via the oil passage 107. Similarly, the B-port outlets 101 and 105 become one inside the valve main body 9 and is in communication with the B-port hole 51 via the oil passage 109.

If still grater flow rate is hoped to be secured, as shown in FIG. 2, by installing another A-port outlet 103' and B-port outlet 101' adjacent to the A-port outlet 103, the area of A- and B-ports outlets can be doubled.

Referring now to FIG. 4 together, to the second oil chamber 70, a pair of top and bottom TB openings 113 in communication with TB-port hole 55 by the oil passage 111 and a pair of top and bottom TA openings 117 in communication with TA-port hole 59 by the oil passage 115 are installed. If still greater flow rate is required for the TA-port and TB-port, as shown in FIG. 2, same as the A-port hole 45 and B-port hole 51, TA opening 117' and TB opening 113' are formed adjacent to the TA openings 117 and TB openings 113 to double the area.

Referring now to FIG. 5, on the top and bottom in the vicinity of the left-side end of the second oil chamber 70, a T-port outlet 119 is installed. This T-port outlet 119 is formed in such a size that it does not deviate from the notch 83 of the spool 11 even when the spool 11 is rotated at a specified angle. An oil passage 121 is formed to allow the T-port outlet 119 to communicate with the T-port hole 61.

In order to smoothly move the spool 11 irrespective of high pressure or low pressure, a bypass port 123 from the low pressure pump port 33 or high pressure pump port 39 is installed to supply a pressure fluid to the groove 85.

Next discussion will be made on the operation of the rotary servo valve 1.

First of all, discussion will be made on the case when the piston 5 is raised at high pressure. Referring now to FIG. 2, the spool 11 is moved to the left side by the linear type actuator 13 to set for high-pressure supply (the condition shown in FIG. 2) and at the same time, the spool 11 is rotated counterclockwise (in FIG. 3) by the servo motor 15.

Under this condition, the pressure oil supply hole 73 of the spool 11 is located right above the high pressure opening 91 and at the same time, the low-pressure opening 87 is closed by the outer circumferential surface of the spool 11. In this event, because notches 77L, 77U of the spool 11 are located above the B-port outlets 101, 106 in the first oil chamber 68, A-port outlets 97, 103 are closed by the outer circumferential surface of the spool 11. In the second oil chamber 70, the notches 81L, 81U are located above the TA opening 117, and the TB opening 113 is closed by the outer circumferential surface of the spool 11.

Consequently, the high-pressure fluid supplied from the high-pressure pump 35 via the pipe conduit 37, high pressure pump port 39 and oil passage 93 enters the first oil chamber 68 from the high-pressure opening 91, passes B-port outlets 105 and 101 from notches 77L and 77U, is supplied to the lower chamber 47 of the hydraulic cylinder 3 via the oil passage 109, B-port hole 51, and pipe conduit 49, and the piston 5 rises.

By the rise of the piston 5, the pressure fluid filled in the upper chamber 41 of the hydraulic cylinder 3 is discharged to the second oil chamber 70 via the pipe conduit 57, TA-port hole 59, oil passage 115, TA opening 117, and notches 81L, 81U, and is further discharged to the oil tank 61 via the notch 83, T-port outlet 119, oil passage 121, T-port hole 65, and pipe conduit 63.

When the piston 5 is descended at high speed, the spool 11 is rotated clockwise (in FIG. 3) by the servo motor 15.

Even under this condition, because the pressure oil supply hole 73 of the spool 11 is located right above the high-pressure opening 91 and at the same time, the low pressure opening 87 is closed by the outer circumferential surface of the spool 11, the high-pressure fluid is supplied to the first oil chamber 68 in the exactly same manner as in the case of raising the piston 5. In such event, in the first oil chamber 68, B-port outlets 101, 105 are held closed by the outer circumferential surface of the spool 11.

Consequently, the pressure fluid supplied to the first oil chamber 68 passes notches 77L, 77U, and comes out from A-port outlets 97, 103, and then is supplied to the upper chamber 41 of the hydraulic cylinder 3 via the oil passage 107, A-port hole 45, and pipe conduit 43, and makes the piston 5 descend.

By the descent of the piston 5, the pressure fluid filled in the lower chamber 47 of the hydraulic cylinder 3 is discharged to the second oil chamber 70 of the spool 11 via the pipe conduit 53, TB-port hole 55, oil passage 111, TB opening 113, and notches 81L, 81U, and is further discharged to the oil tank 61 via the notch 83, T-port outlet 119, oil passage 121, T-port hole 65, and pipe passage 63.

On the other hand, when the piston 5 is raised or descended at low pressure, the spool 11 is moved to the right direction along the spool guiding hole 7 by the linear type actuator 13. Under this condition, the pressure oil supply hole 73 of the spool 11 is located right above the low-pressure opening 87, and the high-pressure opening 91 is closed by the outer circumferential surface of the spool 11.

Consequently, the low-pressure fluid supplied from the low-pressure pump 29 via the pipe conduit 31, low pressure pump port 33, and oil passage 89 is supplied from the low-pressure opening 87 to the first oil chamber 68 via the pressure oil supply port 73. The motion of the pressure fluid thereafter is exactly same as the case of high pressure described before.

As is understood from the above-mentioned functions, it is possible to replace two control valves required in the conventional example with one rotary servo valve 1. With this configuration, the space of the system can be saved and the size can be reduced, and at the same time, hydraulic piping and electrical wiring are reduced, thereby achieving compactness of the system. In addition, by reducing the number of valves can reduce oil leaks, and energy saving is thereby able to be achieved.

According to the rotary servo valve 1, stepless flow rate control is possible by detecting the rotation angle of the spool 11 with an optical rotary encoder 16 and properly controlling the servo motor 15, in addition to the functions of direction change-over valve of pressure oil.

The present invention is not limited by any of the details of description, and is able to be carried out in other modes by making appropriate changes. In the above-mentioned modes of carrying out the invention, the openings and outlets and inlets provided in the valve main body 9 are rounded and notches provided in the spool 11 are rectangular notches, but the combinations of round holes and notch profiles can be changed as required.

Figure 6:
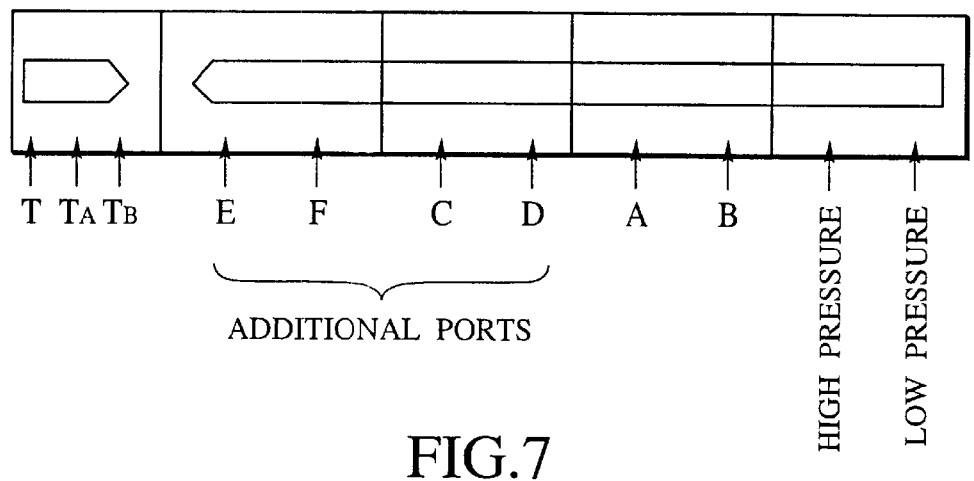
FIG. 6 is a schematic illustration showing the other embodiment.
Figure 7:
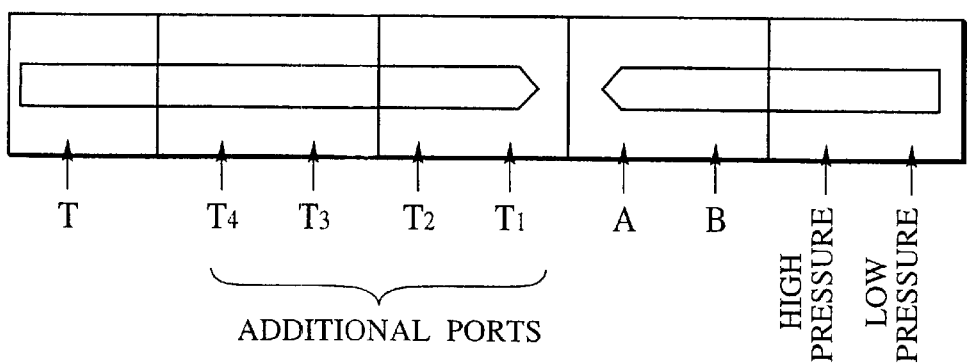
FIG. 7 is a schematic illustration showing another embodiment.

In addition, as shown in FIG. 6, it is possible to add C-, D-, E-, and F-ports in addition to A- and B-ports to be used as direction change-over valves. As shown in FIG. 7, T1-, T2-, T3-, and T4-port holes, etc. may be added.

Now, description will be made on the flow rate control capabilities in the rotary servo valve of the present invention.

Figure 8A:
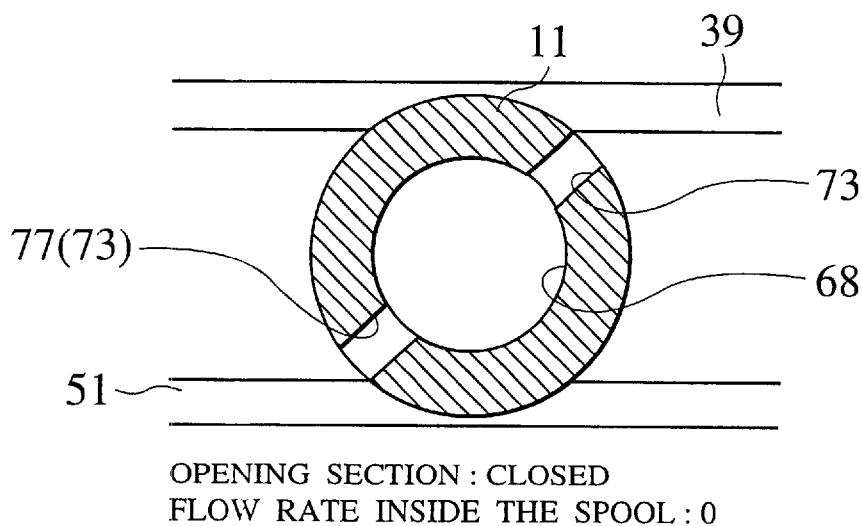
FIGS. 8A through 8C are explanatory illustrations showing the relationship between the compressed oil supply hole and the port hole when the spool is in rotation.
Figure 8B:
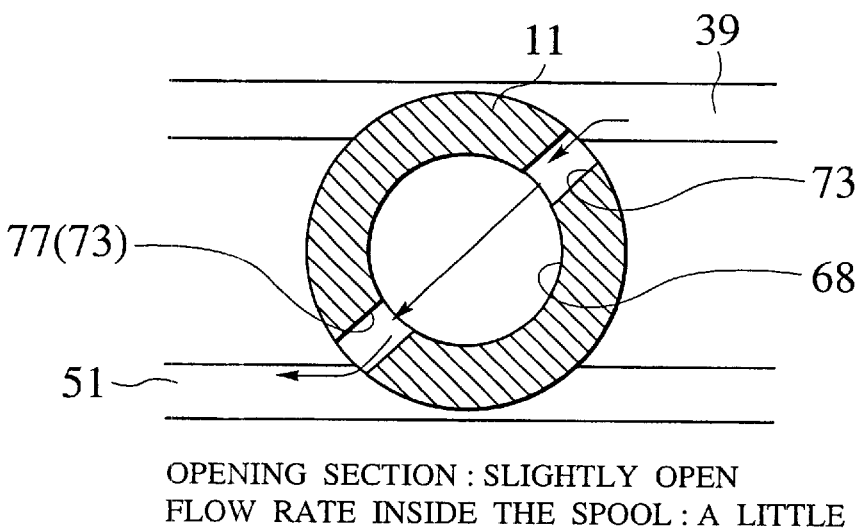
Figure 8C:
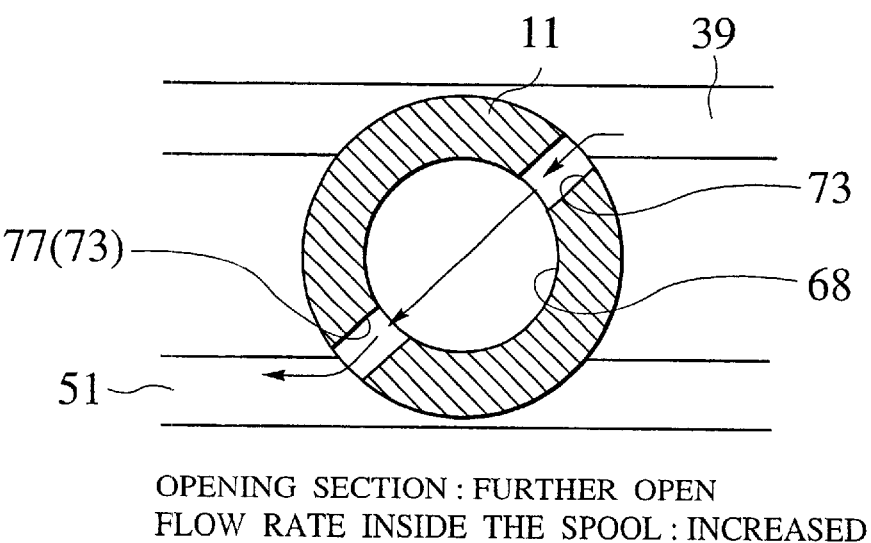

As shown in FIGS. 8A through 8C, by controlling the rotation angle of the spool 11 using the servo motor 15, the area of the pressure oil passing openings formed by port holes provided in the valve main body 9, for example, high-pressure port hole 39 and pressure oil supply hole 73 of the spool 11 and notch 77 of the spool 11 and the cylinder port hole B (or A-port) can be adjusted.

Because the passing flow rate of pressure oil is proportional to the cross sectional area of the openings, changes in the cross-sectional area changes the passing flow rate as shown in FIGS. 8A through 8C.

That is, the control of rotation angle of the spool 11 controls the passing flow rate of pressure oil. When pressure oil passing the valve main body 9 flows in the lower chamber 47 of the hydraulic cylinder 3 via the oil passage 49, the piston 5 rises, and the raising speed is proportional to the flow rate of the pressure oil that flew in. Consequently, controlling the rotation angle of the spool 11 can control the traveling speed (descending speed or rising speed) of the piston 5.

In describing the embodiment, oil is used for the hydraulic fluid, but mixture liquid of water and glycol, demineralized water, liquid with rust prohibitor added to water, etc. may be used.

Figure 9:
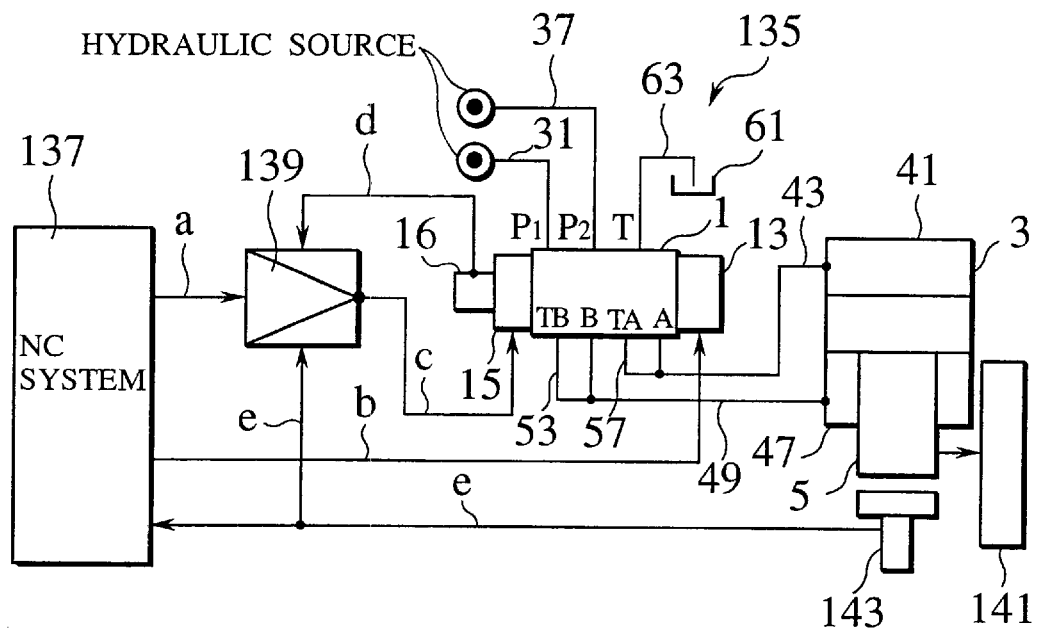
FIG. 9 is an explanatory illustration of a punch press hydraulic servo system.
Figure 10:
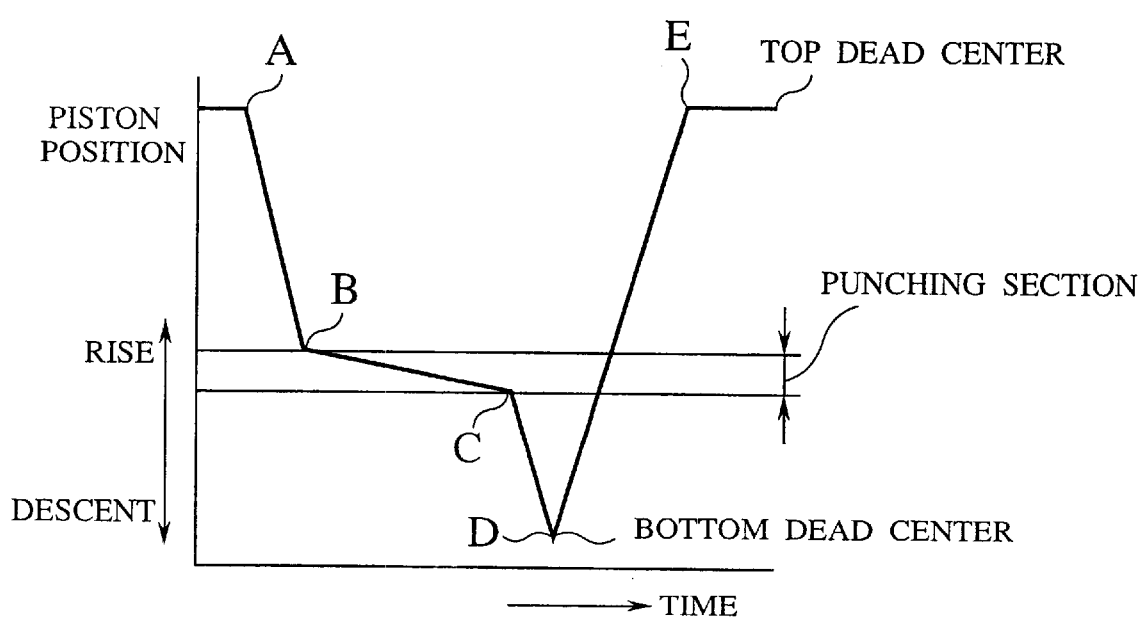
FIG. 10 is a chart showing the piston stroke of a hydraulic cylinder in the hydraulic servo system of FIG. 9.

Referring now to FIG. 9 and FIG. 10, application examples of the rotary servo valve to the punch press hydraulic servo system will be described. FIG. 9 shows one example of the punch press hydraulic servo system 135, and like elements are given like reference characters of parts of rotary servo valve 1 of FIG. 2. FIG. 10 shows one example of stroke chart of the piston 5 of the hydraulic cylinder 3 to be controlled.

As shown in FIG. 9, the hydraulic servo system 135 comprises an NC equipment 137, servo driver 139, rotary servo vale 1, punch press hydraulic cylinder 3 and piston 5, and position sensor 141 for detecting the displacement of piston 5, etc.

In the hydraulic servo system 135, the piston displacement instruction a is outputted from the NC equipment 137 to the servo driver 139 in accordance with the processing process, and at the same time, the pressure changeover instruction b for changing over hydraulic pressure to high pressure or low pressure is outputted to the linear type actuator 13 of the rotary servo valve 1.

To set to the high pressure, the linear type actuator 13 is operated to move the spool 11 to the left side (in FIG. 2). The servo driver 139 converts the piston displacement instruction a to the voltage and outputs it as the rotation instruction c to the servo motor 15 of the rotary servo valve 1.

As the servo motor 15 is rotated at a suitable angle, the spool 11 of the rotary servo valve 1 rotates, and pressure oil (hydraulic fluid) flows in to the upper chamber 41 or the lower chamber 47 of the hydraulic cylinder 3 via the pipe conduit 43 or pipe conduit 49.

The flow-in rate in this event varies in accordance with the rotation angle of the spool 11 of the rotary servo valve 1 and the change of the rotation angle becomes the change of the traveling speed of the piston 5.

Below the piston 5 head end, the punch dies 143 is installed, and by striking the dies with the piston 5, punching is carried out.

The rotation angle of the servo motor 15 is detected by the optical system rotary encoder 16 installed at the tail end of the servo motor 15. The detection value d is fed back to the servo driver 139 to compare and collate the rotation instruction c with this detection value d.

The piston displacement e is detected with the position sensor 141. The piston displacement e detected with this position sensor 141 is fed back to the NC equipment 137 and used for collating the piston displacement instruction a and at the same time notified to the servo driver 139 as the speed feedback signal e.

Referring now to FIG. 9 and FIG. 10, an application example of the hydraulic servo system 135 to drive control of the hydraulic cylinder of a hydraulically-driven punch press is described.

In the stroke curve of the piston 5 of the hydraulic cylinder 3 to be controlled, points A, E are located at the top dead center of the piston 5, and at this position, pressure oil (hydraulic fluid) from the hydraulic source is locked by the spool 11 of the rotary servo valve 1, and is prevented from flowing in the oil chambers (41, 47) of the hydraulic cylinder 3.

The section A-B is a quick approach stroke and no big pressurizing force is required, but the descending speed of the piston 5 becomes the highest. In this section, the pressure change-over instruction b for changing over pressure oil to low pressure is outputted from the NC equipment 137 to the linear type actuator 13, and at the same time, the piston displacement instruction a (high-speed descent instruction) is outputted to the servo motor 15 as the rotation instruction c via the servo drive 139.

As a result, the pressure oil feed hole 73 of the spool 11 moves to the low-pressure opening 87 end, and low-pressure oil is fed to the rotary servo valve 1. And by the servo motor 15, the spool 11 rotates counterclockwise, and as soon as A-port and TB-port are opened, B-port and TA-port are closed to allow pressure oil of low pressure $P_2$ to flow in from the pipe conduit 43 to the upper chamber 41 of the hydraulic cylinder 3, and the piston 5 descents at high speed. The oil in the lower chamber of the hydraulic cylinder 3 is discharged to the oil tank 61 via the pipe conduit 53 and TB-port. The speed of the piston 5 becomes the highest when the port opening of the spool is fully open.

The section B-C is a punching stroke, where the large pressurizing force is required at low descending speed. Here, it should be noted that point B shows the position of the piston head end when the head end of the punch dies prepared below the piston 5 is positioned slightly upwards from the work piece surface.

In this section, the pressure change-over instruction b for changing over pressure oil to high pressure is outputted from the NC equipment to the linear type actuator 13, and at the same time, the piston displacement instruction a (low-speed descent instruction) is outputted to the servo motor 15 as the rotation instruction c via the servo driver 139.

As a result, the pressure oil supply hole 73 of the spool 11 moves to the high-pressure opening 91 end, and high-pressure oil is fed to the rotary servo valve 1. And by the servo motor 15, the spool 11 is rotated and the passing flow rate of the pressure oil supplied to the hydraulic cylinder 3 is reduced to achieve the desired descending speed. By this contrivance, punching at low noise is enabled.

The section C-D is a stroke for shaking off chips downwards, where no large pressurizing force is required but large descending speed is required.

In this section, same as in the section A-B, the pressure change-over instruction b for changing over pressure oil to low pressure $P_2$ is outputted from the NC equipment 137 to the linear type actuator 13, and at the same time, the piston displacement instruction a (high-speed descent instruction) is outputted to the servo motor 15 as the rotation instruction C via the servo drive 139.

As a result, low-pressure oil is fed to the rotary servo valve 1. And by the servo motor 15, the spool 11 is rotated in the direction to increase the opening of the passing flow rate adjusting section of the pressure oil and the hydraulic cylinder 3 is adjusted to achieve the desired descending speed. By this, the pressure oil of a large flow rate is supplied to the hydraulic cylinder 3 and the piston 5 descends at a high speed.

The section D-E is a quick return stroke where the piston is returned to the initial condition at a high speed.

In this section, the pressure changeover instruction b for changing over the pressure oil to low pressure is outputted from the NC equipment 137 to the linear type actuator 13, and at the same time, the piston displacement instruction a (high-speed rise instruction) is outputted to the servo motor 15 as the rotation instruction c via the servo driver 139.

As a result, the pressure oil feed hole 73 of the spool 11 moves to the low-pressure opening 87 end, and low-pressure oil is supplied to the rotary servo valve 1. In addition, the spool 11 is rotated clockwise by the servo motor 15, and as soon as B-port and TA-port are opened, A-port and TB-port are closed, and pressure oil of low pressure $P_2$ flows in from the pipe conduit 49 to the lower chamber 47 of the hydraulic cylinder 3 and the piston 5 rises at a high speed. In addition, since the spool 11 is rotated so as to maximize the opening of the passing flow rate adjusting section of pressure oil, the piston 5 rises to the top dead center at a high speed. The return oil returns to the oil tank 61 via pipe conduit 57 and TA-port.

The four strokes of A-B, B-C, C-D, and D-E are the punching process in which high pressure and low pressure are properly used, and it is a system used for punching when the punching load is large, that is, when the punching hole size is large, or the sheet is thick, or the tensile strength of work piece is high.

On the other hand, when the punching load is small, there is no need to use the high pressure, and there is a system to carry out punching by continuously repeating raising and descending of the piston under a low pressure condition. In such event, the rise and descent motion of the piston 5 may be controlled only by rotating the spool 11 without operating the linear type actuator 13.

In the above-mentioned embodiment, high pressure and low pressure are changed over by reciprocating the spool 311 and rise and descent of the hydraulic cylinder 303 is changed over by the rotation of the spool 311, but conversely, high pressure and low pressure may be changed over by the rotation of the spool 311 and rise and descent of the hydraulic cylinder 303 may be changed over by reciprocating the spool 311.

Next discussion will be made on the second embodiment of the rotary servo valve of the present invention.

FIG. 11 through FIG. 14 show the second embodiment of the rotary servo valve.

Figure 11:
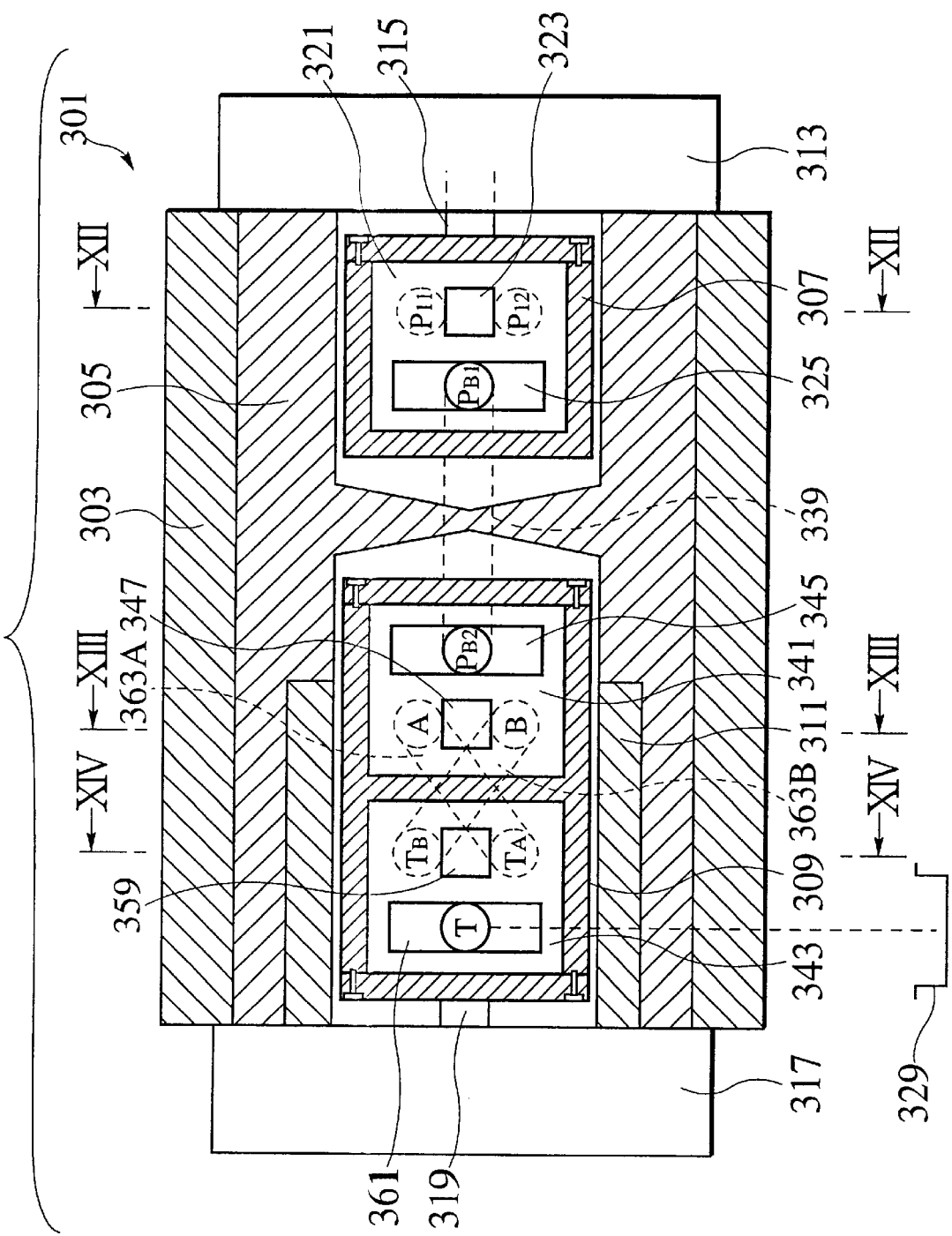
FIG. 11 is a cross-sectional view of the second embodiment of the rotary servo valve related to the present invention.

That is, as shown in FIG. 11, the rotary servo valve 301 has a sleeve 305 fitted in the valve main body 303, and to one side in the sleeve 305, the first rotating spool 307 is rotatably provided, and to the other side, the second rotating spool 309 is rotatably provided. To the other-side inner circumference of the sleeve 305, the inner sleeve 311 is fitted in. And in one side of the valve main body 303, for example, on the right side in FIG. 11, the first rotating actuator 313 is provided, and to the head end of the output shaft 315 of the first rotating actuator 313, the first rotating spool 307 is connected.

On the other side of the valve main body 303, for example, on the left side in FIG. 11, the second rotating actuator 317 is provided, and to the head end of the output shaft 319 of the second rotating actuator 317, the second rotating spool 309 is connected. The illustration of the configuration of the first and the second rotating actuators 313, 317 is omitted, but they are configured with rotors, which are rotated, for example, by electricity or by fluid pressure.

Figure 12:
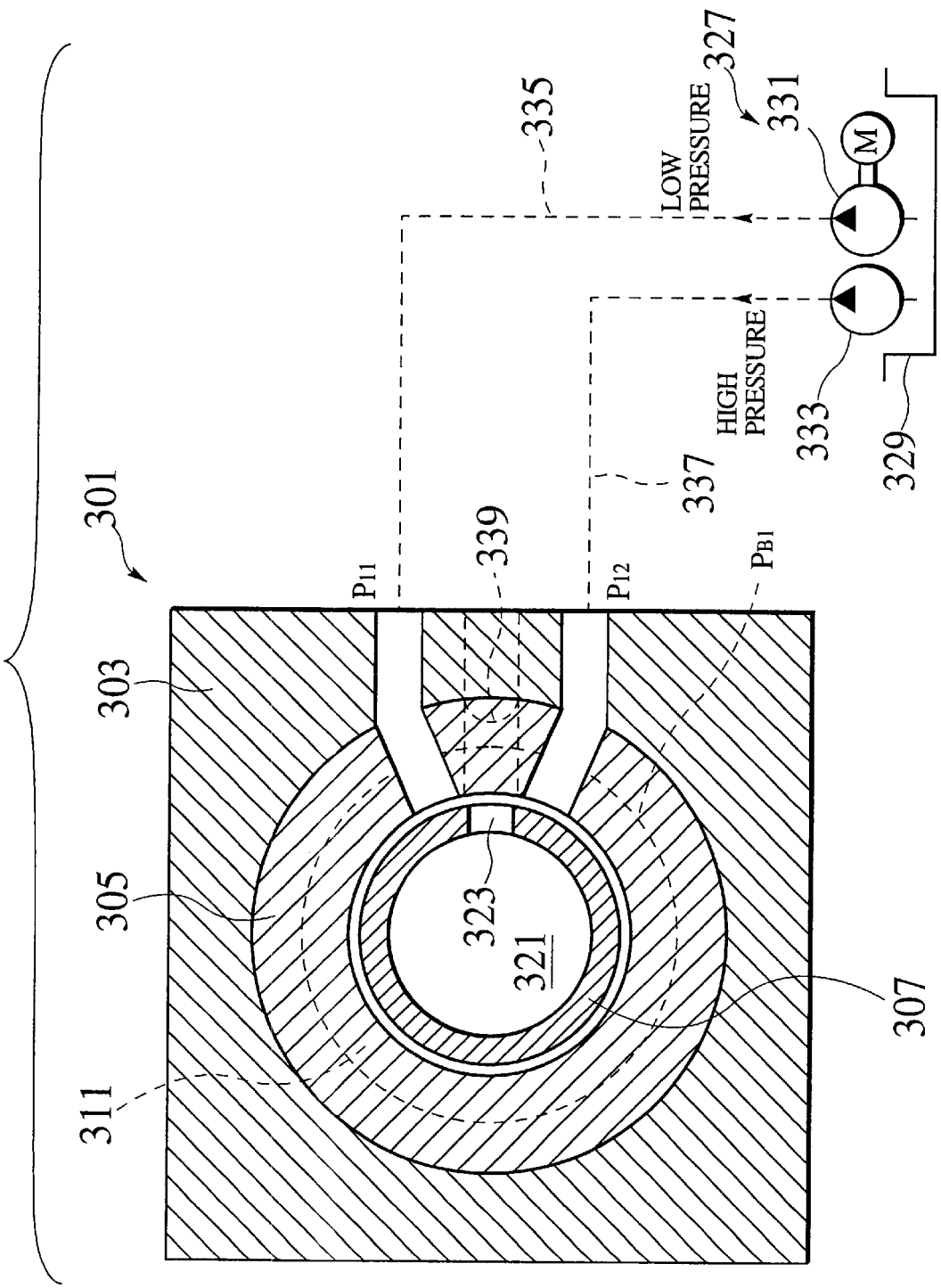
FIG. 12 is a cross-sectional view taken on line XII—XII of FIG. 11.

The inside of the first rotating spool 307 is hollow and a pressure supply chamber 321 is formed, and to the pressure supply chamber 321, the first opening section 323 and the second opening section 325 are formed. For more details, FIG. 12 is also referred. The pressure oil is discharged from the oil tank 329 installed to the hydraulic supply circuit 327 by the drive of a low-pressure pump 331 and a high-pressure pump 333, and the low-pressure pipe conduit 335 and the high-pressure pipe conduit 337 are connected in free communication with the low-pressure opening $P_{11}$ and the high-pressure opening $P_{12}$ formed on the valve main body 303, respectively. The low-pressure opening $P_{11}$ and the high-pressure opening $P_{12}$ pass through the sleeve 305 and the valve main body 303, and are provided in the circumferential direction adjacent to the first opening section 323 formed in the first rotating spool 307, and the first opening section 323 is selectively in communication either with the low pressure opening $P_{11}$ or the high pressure opening $P_{12}$ as the first rotating spool 307 turns.

The second opening section 325 is formed in an elongated hole constantly in communication with the first communication hole $P_{B1}$ that passes through the sleeve 305 even when the first rotating spool 307 turns, and a connection passage 339 connected to the first communication hole $P_{B1}$ is formed on the outer circumference of the sleeve 305.

Inside of the second rotating spool 309, there are two hollow chambers, in which a pressure fluid flow-in chamber 341 and a pressure-fluid discharge chamber 343 are formed. In the pressure fluid flow-in chamber 341, the third opening section 345 and the fourth opening section 347 are formed.

Figure 13:
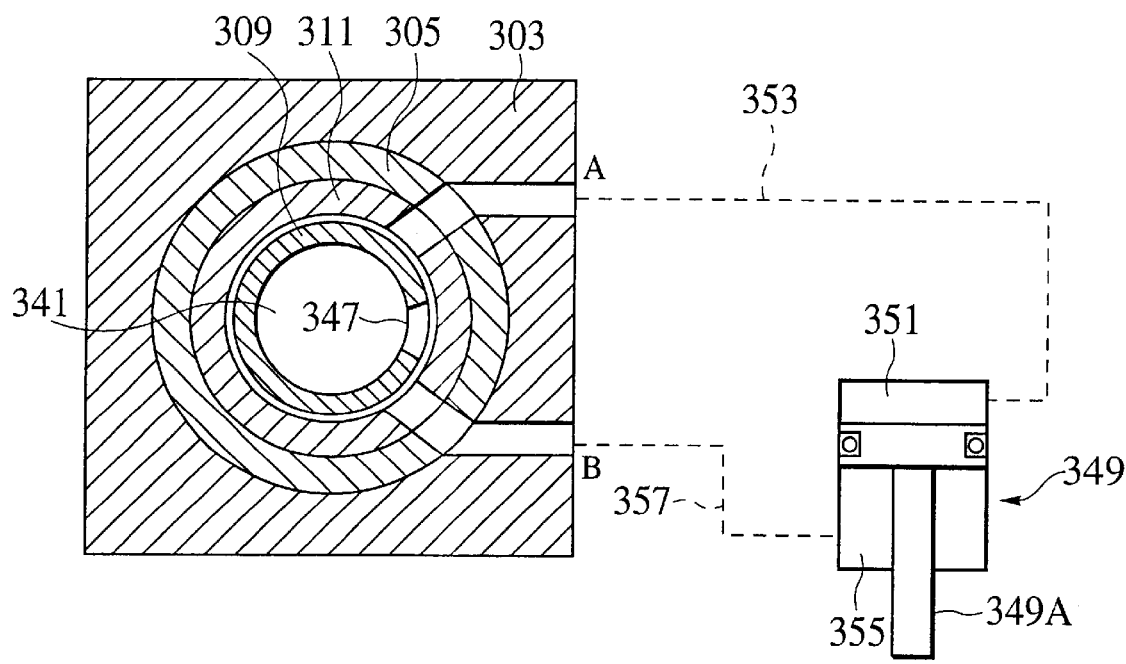
FIG. 13 is a cross-sectional view taken on line XIII—XIII of FIG. 11.

For more detail, refer to FIG. 13 together. The second communication hole $P_{B2}$ that communicates with the connection passage 339 is formed through the sleeve 305, and the third opening section 345 which communicates with this second communication hole $P_{B2}$ is formed in an elongated hole in the circumferential direction so that it is constantly in communication with it even when the second rotating spool 309 turns.

The fourth opening section 347 is equipped with a descent port A for supplying pressure oil to the upper oil chamber 351 of the cylinder 349 equipped with, for example, a piston rod 349A as a drive unit as shown in FIG. 13 via the pipe conduit 353, and a rise port B for supplying pressure oil to the lower oil chamber 355 of the cylinder 349 via the pipe conduit 357. The descent port A and the rise port B pass through the inner sleeve 311 and the sleeve 305 and the valve main body 303, and is formed in the circumferential direction adjacent to the fourth opening section 347, and the fourth opening section 347 is selectively in communication with the descent port A or the rise port B as the second rotating spool 309 turns.

Figure 14:
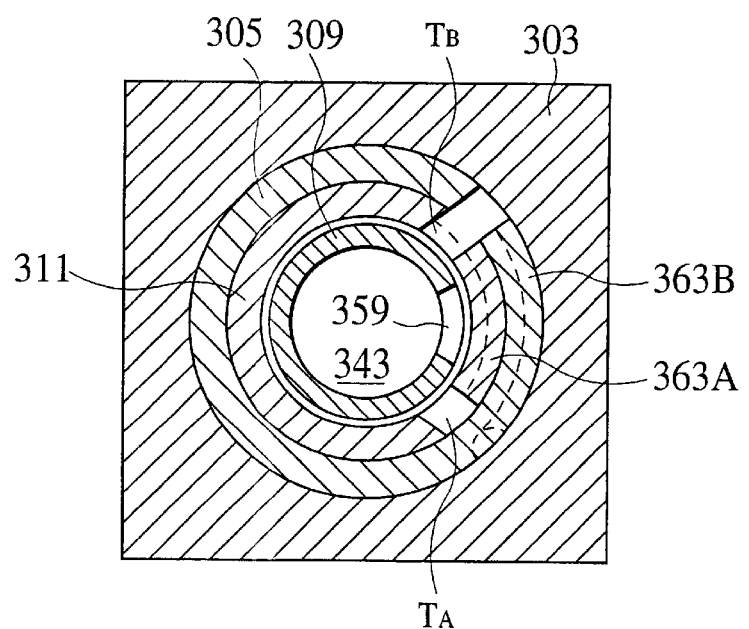
FIG. 14 is a cross-sectional view taken on line XIV—XIV of FIG. 11.

To the pressure fluid discharge chamber 343, the fifth opening section 359 and the sixth opening section 361 are formed. For more details, FIG. 14 is referred together. A discharge-side descent port $T_A$ and a discharge-side rise port $T_B$ are formed in the circumferential direction adjacent to the fifth opening section 359. This discharge-side descent port $T_A$ passes through the inner sleeve 311 and communicates with the descent port A via the first connection passage 363A formed on the outer circumference of the inner sleeve 311. In addition, the discharge-side rise port $T_B$ passes through the inner sleeve 311 and the sleeve 305, and communicates with the rise port B via the second connection passage 363B formed on the outer circumference of the sleeve 305 and provided intersecting the first connection passage 363A. Consequently, the fifth opening section 359 selectively communicates with the discharge-side descent port $T_A$ or the discharge-side rise port $T_B$ as the second rotating spool 309 turns.

The sixth opening section 361 is formed in an elongated form extended in the circumferential direction which constantly communicates with the drain port T that passes through the inner sleeve 311 and the sleeve 305 and the valve main body 303 and communicates with the oil tank 329, even when the second rotating spool 309 turns.

By the configuration as described above, the pressure fluid fed by the low-pressure pump 331 or high pressure pump 333 is sent to the low-pressure opening $P_{11}$ or the high-pressure opening $P_{12}$ formed on the valve main body 303, and either of the openings is chosen by the rotation of the first rotating actuator 313, and the pressure fluid flows into the pressure supply chamber 321 of the first rotating spool 307 from the first opening section 323.

The pressure fluid flowing into the pressure supply chamber 321 passes the first communication hole $P_{B1}$ from the second opening section 325 and is guided to the second communication hole $P_{B2}$ via the connection passage 339. The pressure fluid flows into the pressure fluid flow-in chamber 341 from the third opening section 345 located in the pressure fluid flow-in chamber 341 of the second rotating spool 309. The pressure fluid guided in the pressure fluid flow-in chamber 341 is allowed to flow in either to the upper oil chamber 351 or the lower oil chamber 355 of the cylinder 349 by communicating with either selected port, the descent port A or the rise port B, from the fourth opening section 347, and moves up and down the piston rod 349A of the cylinder 349 to carry out operation.

The descent port A is in communication with the discharge-side descent port $T_A$ via the first connection passage 363A, and the rise port B is in communication with the discharge-side rise port $T_B$ via the second connection passage 363B, and the discharge-side descent port $T_A$ and the discharge-side rise port $T_B$ are selectively in communication with the fifth opening section 359. That is, when the pressure fluid is supplied to the upper oil chamber 351 of the cylinder 349 from the descent port A, the pressure fluid flows into the pressure fluid discharge chamber 343 from the rise port B via the second connection passage 363B and then via the fifth opening section 359 from the discharge-side raising port $T_B$, and is returned to the oil tank 329 from the drain port T from the sixth opening section 361.

When the pressure fluid is supplied from the rise port B to the lower oil chamber 355 of the cylinder 349, the pressure fluid flows into the pressure fluid discharge chamber 343 from the descent port A via the first connection passage 363A and then via the fifth opening section 359 from the discharge-side descent port $T_A$, and is returned to the oil tank 329 via the drain port T from the sixth opening section 361.

Consequently, the rotary servo valve according to the present invention serves as a hydraulic control valve of machine tools and drawing machines and carries out both pressure control and flow rate control with one valve, and thereby achieves reduced oil leak and energy saving because no pilot valve is used. In addition, hydraulic piping and electric wiring can be simplified to achieve cost reduction, and the installation direction of the control valve is no longer restricted, eliminating the waste in space.

Now, the third embodiment of the rotary servo valve according to the present invention will be described.

Figure 15:
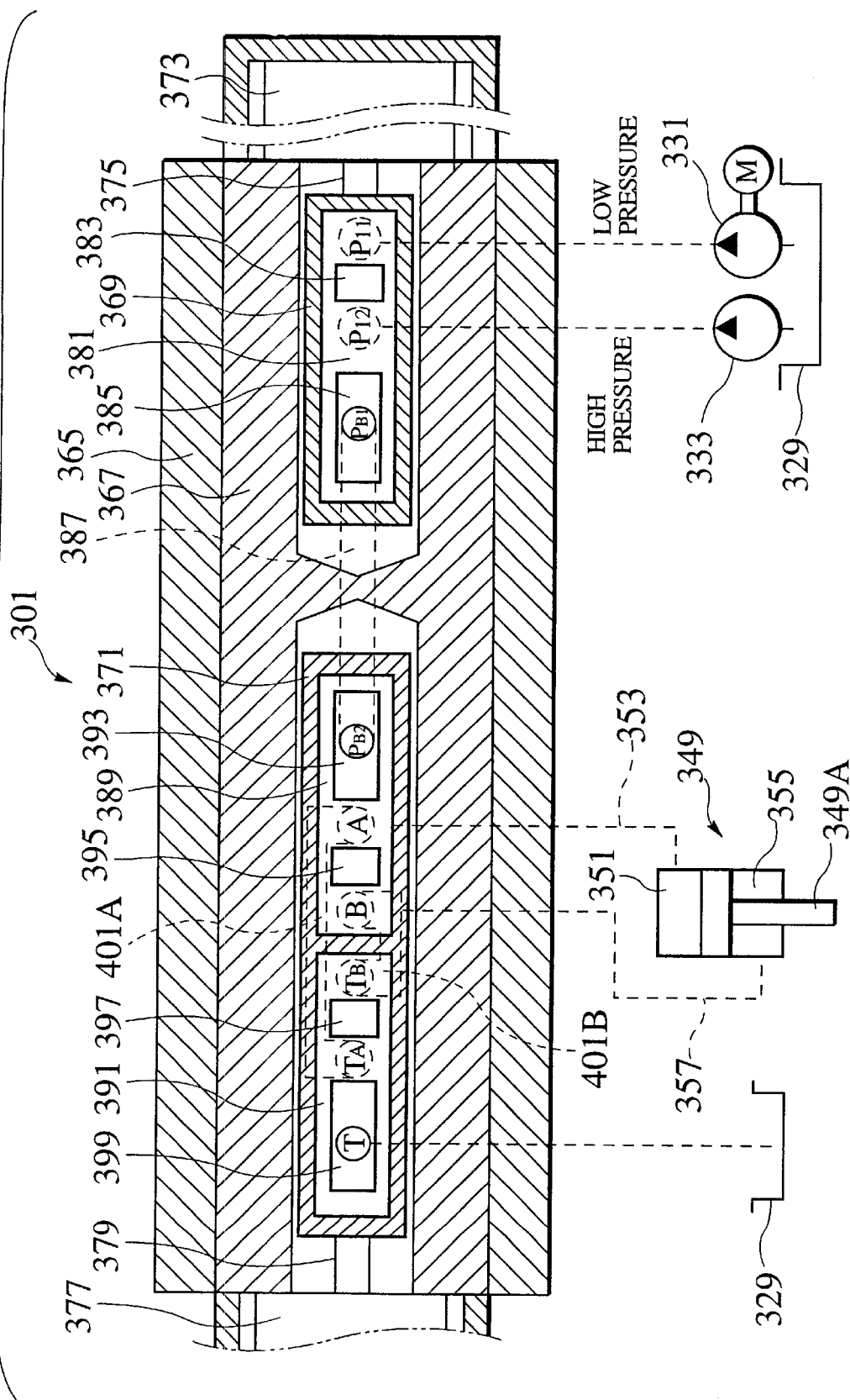
FIG. 15 is a cross-sectional view of the third embodiment of the rotary servo valve related to the present invention.

FIG. 15 shows the third embodiment of the rotary servo valve. Since the portion of the third embodiment which differs from the second embodiment described above is that each spool is mounted free to reciprocate in the horizontal direction, with others remaining same, like elements are given like reference characters, and the explanation will be omitted.

Referring now to FIG. 15, the rotary servo valve 301 has the sleeve 367 fitted into the valve main body 365, and on one side in the sleeve 367, the first sliding spool 369 is mounted free to reciprocate in the horizontal direction, and to the other side, the second sliding spool 371 is mounted free to reciprocate in the horizontal direction. On one side of the valve main body 365, for example, on the right side in FIG. 15, the first sliding actuator 373 is mounted, and at the head end of the output shaft 375 of the first sliding actuator 373, the first sliding spool 369 is connected.

On the other side of the valve main body 365, for example, on the left side in FIG. 15, the second sliding actuator 377 is provided, and to the head end of the output shaft 379 of the second sliding actuator 377, the second sliding spool 371 is connected. The configuration of the first and the second sliding actuators 373, 377 is not illustrated, but they are configured with, for example, direct-acting motors.

The inside of the first sliding spool 369 is hollow, in which a pressure supply chamber 381 is formed, and to this pressure supply chamber 381, the first opening section 383 and the second opening section 385 are formed. Adjacent to the first opening section 383, a low pressure opening $P_{11}$ and a high-pressure opening $P_{12}$ are formed right and left in the axial direction passing through the sleeve 367 and the valve main body 365, and the low-pressure opening $P_{11}$ communicates with the low-pressure pump 331 and the high-pressure opening $P_{12}$ communicates with the high-pressure pump 333.

Consequently, moving the first sliding spool 369 in the horizontal direction by the action of the first sliding actuator 373 allows the first opening section 383 to selectively communicate with the low-pressure opening $P_{11}$ or with the high-pressure opening $P_{12}$.

The second opening section 385 is formed in an elongated hole profile extending in the axial direction so that it constantly communicates with the first communication hole $P_{B1}$ passing through the sleeve 367 even if the first sliding spool 369 travels horizontally, and a connection passage 387 connected to the first connection hole $P_{B1}$ is formed on the outer circumference of the sleeve 367.

In the second sliding spool 371, there are two hollow chambers, in which a pressure fluid flow-in chamber 389 and a pressure fluid discharge chamber 391 are formed. The pressure fluid flow-in chamber 389 is provided with the third opening section 393 and the fourth opening section 395, and the second connection hole $P_{B2}$ for communication with the connection passage 387 is formed passing through the sleeve 367, and the third opening section 393 for communication with the second connection hole $P_{B2}$ is formed in an elongated hole profile extending in the axial direction so that it constantly communicates with the second communication hole $P_{B2}$ even when the second sliding spool 371 travels horizontally.

The fourth opening section 395 has a descent port A for supplying the pressure fluid to the upper oil chamber 351 of the cylinder 349 through the pipe conduit 353 and a rise port B for supplying pressure fluid to the lower oil chamber 355 through the pipe conduit 357, and the descent port A and the rise port B pass through the sleeve 367 and the valve main body 365 and are provided adjacently on the right and left sides in the axial direction of the fourth opening section 395. When the second sliding spool 371 travels in the horizontal direction, the fourth opening section 395 communicates selectively with the descent port A or rise port B.

To the pressure fluid discharge chamber 391, the fifth opening section 397 and the sixth opening section 399 are equipped, and a discharge-side descent port $T_A$ and discharge-side rise port $T_B$ are equipped adjacently on the right and left sides in the axial direction of the fifth opening section 397. The discharge-side descent port $T_A$ passes through the sleeve 367 and communicates with the descent port A via the first connection passage 401A formed on the outer circumference of the sleeve 367. In addition, the discharge-side rise port $T_B$ passes through the sleeve 367 and communicates with the rise port B via the second connection passage 401B formed on the outer circumference of the sleeve 367. Consequently, by allowing the second sliding spool 371 to travel in the horizontal direction, the fifth opening section 397 selectively communicates with the discharge-side descent port $T_A$ or the discharge-side rise port $T_B$.

The sixth opening section 399 is formed in an elongated hole profile extending in the axial direction so that it constantly communicates with the drain oil port T passing through the sleeve 367 and the valve main body 365 and for communication with the oil tank 329, even when the second sliding sleeve 371 travels horizontally.

By the configuration as described above, the pressure fluid supplied by the low-pressure pump 331 or the high-pressure pump 333 is sent to the low-pressure opening $P_{11}$ or the high-pressure opening $P_{12}$ provided in the valve main body 365, and either opening is selected by the horizontal travel of the first sliding actuator 373, and the pressure fluid flows in from the first opening section 383 to the pressure supply chamber 381 of the first sliding spool 369.

The pressure fluid that flows in the pressure supply chamber 381 passes the first communication hole $P_{B1}$ from the second opening section 385 and is guided to the second communication hole $P_{B2}$ via the connection passage 387. The pressure fluid flows into the pressure fluid flow-in chamber 389 from the third opening section 393 provided in the pressure fluid flow-in chamber 389 of the second sliding spool 371. When the pressure fluid guided inside the pressure fluid flow-in chamber 389 is allowed to communicate with either one of selected descent port A or rise port B from the fourth opening section 395, the pressure fluid inside the upper oil chamber 351 of the cylinder 349 is then allowed to flow in the lower oil chamber 355, and the piston rod 349A of the cylinder 349 is caused to travel vertically to enable the operation to take place.

The descent port A communicates with the discharge-side descent port $T_A$ via the first connection passage 401A, the rise port B communicates with the discharge-side rise port $T_B$ via the second connection passage 401B, and the discharge-side descent port $T_A$ and the discharge-side rise port $T_B$ are allowed to selectively communicate to the fifth opening section 397. That is, when the pressure fluid is fed from the descent port A to the upper oil chamber 351 of the cylinder 349, the pressure fluid at the rise port B flows from the discharge-side rise port $T_B$ via the second connection passage 401B into the pressure fluid discharge chamber 391 through the fifth opening section 397, and the pressure fluid is returned from the sixth opening section 399 to the oil tank 329 via the drain port T.

In addition, when the pressure fluid is fed from the rise port B to the lower oil chamber 355 of the cylinder 349, the pressure fluid of the descent port A flows from the discharge-side descent port $T_A$ via the first connection passage 401A into the pressure fluid discharge chamber 391 through the fifth opening section 397, and is returned from the sixth opening section 399 to the oil tank 329 via the drain port T.

Consequently, the effects are the same as those of the second embodiment; namely, both pressure control and flow rate control can be carried out with one valve, reduced oil leak and energy saving are achieved, hydraulic piping and electric wiring can be simplified to achieve cost reduction, and the installation direction of the control valve is no longer restricted, eliminating the waste in space.

Now the fourth embodiment in the rotary servo valve of the present invention will be explained.

Figure 16:
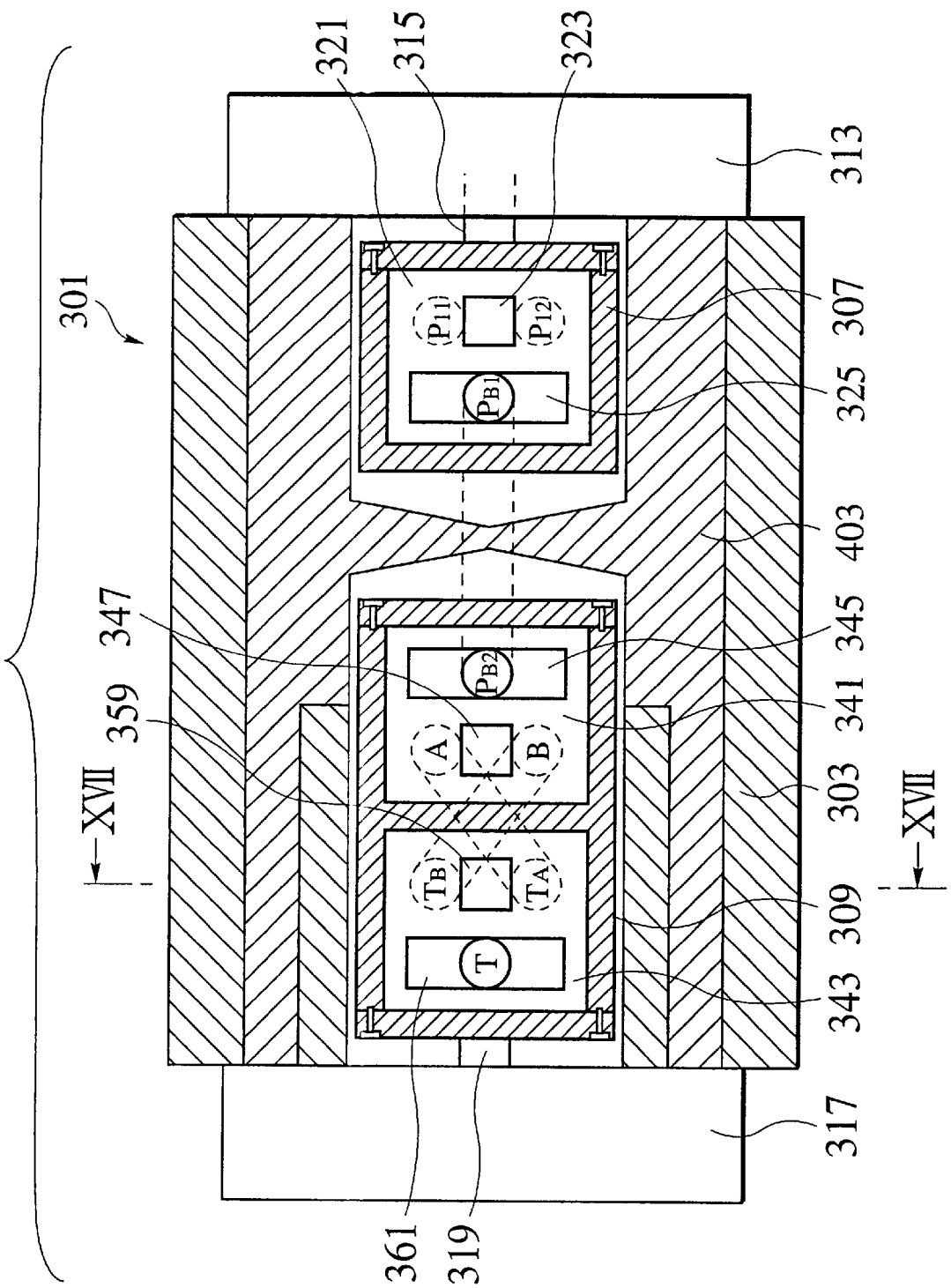
FIG. 16 is a cross-sectional view of the fourth embodiment of the rotary servo valve related to the present invention.
Figure 17:
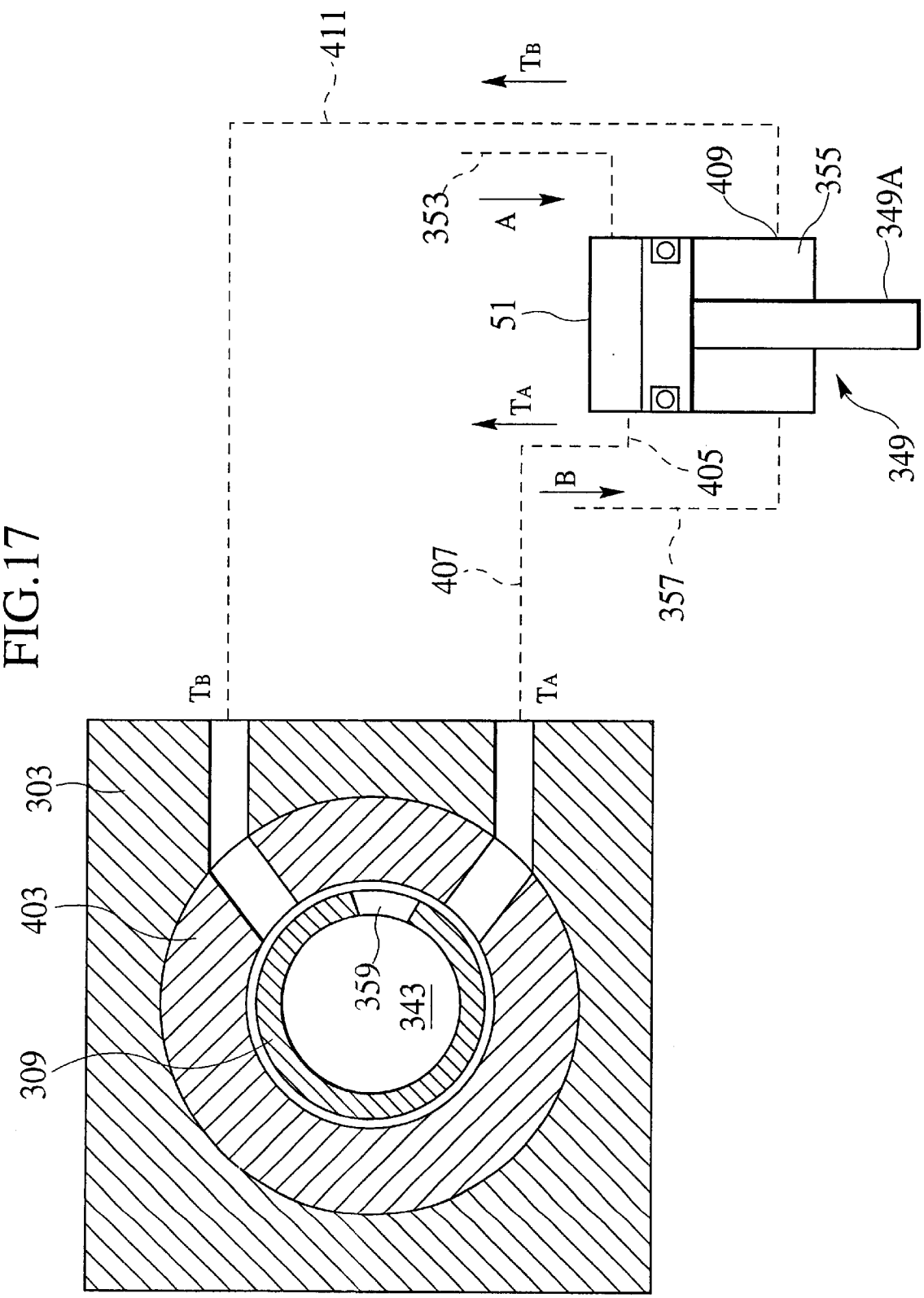
FIG. 17 is a cross-sectional view taken on line XVII—XVII of FIG. 16.

FIG. 16 and FIG. 17 show the fourth embodiment of the rotary servo valve. The majority of the fourth embodiment is identical to the second embodiment, and what is different is that the fourth embodiment is not equipped with the inner sleeve 311, and the descent port A and the rise port B are not in communication with the discharge-side descent port $T_A$ and the discharge-side rise port $T_B$ but are independent, and other members are of the same configuration. Consequently, like elements are given like reference characters and their explanation will be omitted, and explanation will be made only for the different portions.

Referring now to FIG. 16 and FIG. 17, one portion different from the second embodiment described above is the absence of the inner sleeve 311, and the integral sleeve 403 is provided with the second rotating spool 309 rotated by the second rotating actuator 317. The pressure fluid flow-in chamber 341 formed in the second rotating spool 309 is provided with the third opening section 345 and the fourth opening section 347, and the fourth opening section 347 is selectively in communication with the descent port A and the rise port B, and the descent port A is formed passing through the sleeve 403 and the valve main body 303, and communicates with the upper oil chamber 351 of the cylinder 349 via the pipe conduit 353. The rise port B is formed passing through the sleeve 403 and the valve main body 303, and communicates with the lower oil chamber 355 of the cylinder 347 via the pipe conduit 357.

On the other hand, the pressure fluid discharge chamber 343 in the second rotating spool is provided with the fifth opening section 359 and the sixth opening section 361, and the fifth opening section 359 selectively communicates with the discharge-side descent port $T_A$ and the discharge-side rise port $T_B$, and the discharge-side descent port $T_A$ is provided passing through the sleeve 403 and the valve main body 303. As shown in FIG. 17, the discharge-side descent port $T_A$ communicates with the upper oil chamber oil drain port 405 provided in the upper oil chamber 351 of the cylinder 349 via the pipe conduit 407, and the discharge-side rise port $T_B$ passes the sleeve 403 and the valve main body 303 and communicates with the lower oil chamber drain oil port 409 provided in the lower oil chamber 355 of the cylinder 349 via the pipe conduit 411.

By the above configuration, when the piston rod 349A of the cylinder 349 descends, the second rotating actuator 317 rotates in such a manner as to enable the fourth opening section 347 to communicate with the descent port A, and the pressure oil passes the descent port A from the fourth opening section 347 and makes the piston rod 347A descend. In such event, the oil inside the lower oil chamber 355 of the cylinder 349 is discharged from the fifth opening section 359 via the discharge-side rise port $T_B$ from the lower oil chamber oil drain port 409, passes the oil drain port T from the sixth opening section 361 and returns to the oil tank 329.

When the piston rod 349A of the cylinder 349 rises, the second rotating actuator 317 rotates in such a manner as to enable the fourth opening section 347 to communicate with the rise port B, and the pressure oil passes the rise port B from the fourth opening section 347 and makes the piston rod 349A rise. In such event, the oil inside the upper oil chamber 351 of the cylinder 349 is discharged from the fifth opening section 359 via the discharge-side descent port $T_A$ from the upper oil chamber oil drain port 405, passes the oil drain port T from the sixth opening section 361 and returns to the oil tank 329.

Consequently, the effects are identical to those of the second embodiment described above, and since no inner sleeve 311 is required and the first and the second connection passages 363A, 363B are not necessary to be installed, further cost reduction is able to be achieved.

Now the description will be made on the fifth embodiment in the rotary servo valve of the present invention.

FIG. 18 shows the fifth embodiment of the rotary servo valve. The majority of the fifth embodiment is identical to the third embodiment, and what is different is that the descent port A and the rise port B are not in communication with the discharge-side descent port $T_A$ and the discharge-side rise port $T_B$ but are independent, and other members are of the same configuration. Consequently, like elements are given like reference characters and their explanation will be omitted, and explanation will be made only for the different portions.

Referring now to FIG. 18, the portion different from the third embodiment described above is that the second sliding spool 371 is mounted in the integral sleeve 413, and the pressure fluid flow-in chamber 389 formed in the second sliding spool 371 is provided with the third opening section 393 and the fourth opening section 395, and the fourth opening section 395 is selectively in communication with the descent port A and the rise port B, and the descent port A is provided passing through the sleeve 413 and the valve main body 365, and communicates with the upper oil chamber 351 of the cylinder 349 via the pipe conduit 353. The rise port B is provided passing through the sleeve 413 and the valve main body 365, and communicates with the lower oil chamber 355 of the cylinder 349 via the pipe conduit 357.

On the other hand, the pressure fluid discharge chamber 391 formed in the second sliding spool 371 is provided with the fifth opening section 397 and the sixth opening section 399, and the fifth opening section 397 selectively communicates with the discharge-side descent port $T_A$ and the discharge-side rise port $T_B$, and the discharge-side descent port $T_A$ is provided passing through the sleeve 413 and the valve main body 365. The discharge-side descent port $T_A$ communicates with the upper oil chamber oil drain port 405 provided in the upper oil chamber 351 of the cylinder 349 via the pipe conduit 407, and the discharge-side rise port $T_B$ passes the sleeve 413 and the valve main body 365 and communicates through drain oil port 409 provided in the lower oil chamber 355 of the cylinder 349 via the pipe conduit 411.

By the above configuration, when the piston rod 349A of the cylinder 349 descends, the second sliding actuator 377 operates in such a manner as to enable the fourth opening section 395 to communicate with the descent port A, and the pressure oil passes the descent port A from the fourth opening section 395 and makes the piston rod 349A descend. In such event, the oil inside the lower oil chamber 355 of the cylinder 349 is discharged from the fifth opening section 397 via the discharge-side rise port $T_B$ from the lower oil chamber oil drain port 409, passes the oil drain port T from the sixth opening section 399 and returns to the oil tank 329.

When the piston rod 349A of the cylinder 349 rises, the second sliding actuator 377 operates in such a manner as to enable the fourth opening section 395 to communicate with the rise port B, and the pressure oil passes the rise port B from the fourth opening section 395 and makes the piston rod 349A rise. In such event, the oil inside the upper oil chamber 351 of the cylinder 349 is discharged from the fifth opening section 397 via the discharge-side descent port $T_A$ from the upper oil chamber oil drain port 405, passes the oil drain port T from the fifth opening section 399 and returns to the oil tank 329.

Consequently, the effects are identical to those of the third embodiment described above, and since no first and the second connection passages 401A, 401B are required to be installed, further cost reduction is able to be achieved.

The present invention is not limited by any of the embodiments described above, but can be carried out in other modes by providing suitable modifications. For example, the profile of each opening section and each port may be round or square, their combinations are free according to the pressure and flow rate characteristics required. In addition, each opening section and each port may not be provided only on one side but a plurality of opening sections and ports may be provided symmetrically on right and left to increase the flow rate, and if a large amount of pressure must be controlled, a required number of openings such as $P_1, P_2, \ldots, P_n$ may be possible. Furthermore, by designating each port as A, B, ..., n, and $T_A, T_B, \ldots, T_n$, the flow rate control of the hydraulic system to be controlled (for example, cylinder, etc.) can be freely set, and they may also be divided into many branches.

In each of the above embodiments, cases using oil for the pressure fluid are explained, but air may be used.

INDUSTRIAL APPLICABILITY

According to each of the above-mentioned embodiments, it is possible to replace control valves which used to be required by two in the conventional example with one piece of rotary servo valve. As a result, the pressure propagation time is able to be greatly shortened as compared to the conventional example, the valve response speed is improved, and high-speed hydraulic control becomes possible. In addition, since space reduction and size reduction of the equipment also become possible, and the number of hydraulic piping and electrical wiring is reduced, the equipment can be simplified. Furthermore, reducing the number of valves can reduce the fear of oil leakage, and energy saving can be achieved. In addition, there is no limitation in the control valve mounting direction and waste of space can be eliminated.

According to the above-mentioned rotary servo valve, in addition to the function of direction change-over valve of pressure oil, detecting the rotation angle of the spool with an optical system rotary encoder and properly controlling the servo motor enable the stepless flow rate control. In particular, the use of the optical system rotary encoder can achieve high accuracy control nearly free of influence of temperature changes.

When the hydraulic servo system that utilizes the rotary servo valve of the present invention is applied to the control of punch press hydraulic cylinder, the speed and pressurizing force of the hydraulic cylinder can be controlled at high speed and at high accuracy.

What is claimed is:

1. A rotary servo valve comprising:
    a valve main body (303) provided with a plurality of intake ports ($P_{11}, P_{12}$) for taking in a plurality of pressure fluids which have pressures different to one another and a plurality of supply ports (A, B) for supplying a plurality of pressure fluids taken in to the desired drives;
    a first rotating spool (307) that has a hollow, and is installed to be inserted into the valve main body (303) while being free to rotate, and selectively allows one of the plurality of intake ports ($P_{11}, P_{12}$) to communicate with the hollow;
    a first rotating actuator (313) for rotating the first rotating spool (307);
    a second rotating spool (309) that has a hollow, and is installed to be inserted into the valve main body (303) while being free to rotate, and selectively allows one of the plurality of supply ports (A, B) to communicate with the hollow; and
    a second rotating actuator (317) for rotating the second rotating spool (309),
    wherein the valve main body (303) has a connection passage (339) that interconnects pressure fluids in the hollows of the first and the second rotating spools (307, 309).

2. The rotary servo valve according to claim 1, wherein the plurality of intake ports ($P_{11}, P_{12}$) includes a high-pressure opening ($P_{12}$) for taking in high-pressure fluid and a low-pressure opening ($P_{11}$) for taking in low-pressure fluid, and the plurality of supply ports (A, B) includes a descent port (A) for supplying pressure fluid to the upper chamber (351) of the cylinder (349) operated by the pressure fluid and a rise port (B) for supplying pressure fluid to the lower chamber (355) of the cylinder (349).

3. The rotary servo valve according to claim 1, wherein a hollow wall of the first rotating spool (307) is provided with a first opening section (323) that is allowed to selectively communicate with the plurality of intake ports ($P_{11}$, $P_{12}$) and a second opening section (325) that communicates with the connection passage (339) of the valve main body (303), and the second rotating spool (309) is provided with a hollow pressure fluid flow-in chamber (341) and a pressure fluid discharge chamber (343), and the pressure fluid flow-in chamber (341) is provided with a third opening section (345) that communicates with the connection passage (339) and a fourth opening section (347) that is allowed to selectively communicate with a descent port (A) and a rise port (B) that respectively communicates with the upper chamber (351) and the lower chamber (335) of the cylinder (349), and the pressure fluid discharge chamber (343) is provided with a fifth opening section (359) that is allowed to selectively communicate with a discharge-side descent port ($T_A$) and a discharge-side rise port ($T_B$) that respectively communicates with the descent port (A) and the rise port (B) through first and second connection passages (363A, 363B) and a sixth opening section (361) that communicates with an oil drain port (T) that connects to an oil tank (329).

4. The rotary servo valve according to claim 1, wherein a hollow wall of the first rotating spool (307) is provided with a first opening section (323) that is allowed to selectively communicate with the plurality of intake ports ($P_{11}$, $P_{12}$) and a second opening section (325) that communicates with the connection passage (339) of the valve main body (303), and the second rotating spool (309) is provided with a hollow pressure fluid flow-in chamber (341) and a pressure fluid discharge chamber (343), and the pressure fluid flow-in chamber (341) is provided with a third opening section (345) that communicates with the connection passage (339) and a fourth opening section (347) that is allowed to selectively communicate with a descent port (A) and a rise port (B) that respectively communicates with the upper chamber (351) and the lower chamber (335) of the cylinder (349), and the pressure fluid discharge chamber (343) is provided with a fifth opening section (359) that is allowed to selectively communicate with a discharge-side descent port ($T_A$) and a discharge-side rise port ($T_B$) that respectively communicates with a lower oil drain port and an upper oil drain port that are respectively located at the upper chamber (351) and the lower chamber (355) of the cylinder (349), and a sixth opening section (361) that communicates with an oil drain port (T) that connects to an oil tank (329).

5. A rotary servo valve comprising:
a valve main body (365) provided with a plurality of intake ports ($P_{11}$, $P_{12}$) for taking in a plurality of pressure fluids which have pressures different to one another and a plurality of supply ports (A, B) for supplying a plurality of pressure fluids taken in to the desired drives;
a first sliding spool (369) that has a hollow, and is installed to be inserted into the valve main body (365) while being free to reciprocate, and selectively allows one of the plurality of intake ports ($P_{11}$, $P_{12}$) to communicate with the hollow;
a first sliding actuator (373) for sliding the first sliding spool (369);

a second sliding spool (371) that has a hollow, and is installed to be inserted into the valve main body (363) while being free to reciprocate, and selectively allows one of the plurality of supply ports (A, B) to communicate with the hollow; and
a second sliding actuator (377) for sliding the second sliding spool (371),
wherein the valve main body (365) has a connection passage (387) that interconnects pressure fluids in the hollows of the first and the second sliding spools (369, 371).

6. The rotary servo valve according to claim 5, wherein the plurality of intake ports ($P_{11}$, $P_{12}$) includes a high-pressure openings ($P_{12}$) for taking in high-pressure fluid and low-pressure openings ($P_{11}$) for taking in low-pressure fluid, and the plurality of supply ports (A, B) includes a descent port (A) for supplying pressure fluid to the upper chamber (351) of the cylinder (349) operated by the pressure fluid and a rise port (B) for supplying pressure fluid to the lower chamber (355) of the cylinder (349).

7. The rotary servo valve according to claim 5, wherein a hollow wall of the first sliding spool (369) is provided with a first opening section (383) that is allowed to selectively communicate with the plurality of intake ports ($P_{11}$, $P_{12}$) and a second opening section (385) that communicates with the connection passage (387) of the valve main body (365), and the second sliding spool (371) is provided with a hollow pressure fluid flow-in chamber (389) and a pressure fluid discharge chamber (391), and the pressure fluid flow-in chamber (389) is provided with a third opening section (393) that communicates with the connection passage (387) and a fourth opening section (395) that is allowed to selectively communicate with a descent port (A) and a rise port (B) that respectively communicates with the upper chamber (351) and the lower chamber (335) of the cylinder (349), and the pressure fluid discharge chamber (391) is provided with a fifth opening section (397) that is allowed to selectively communicate with a discharge-side descent port ($T_A$) and a discharge-side rise port ($T_B$) that respectively communicates with the descent port (A) and the rise port (B) through first and second connection passages (401A, 401B) and a sixth opening section (399) that communicates with an oil drain port (T) that connects to an oil tank (329).

8. The rotary servo valve according to claim 5, wherein a hollow wall of the first sliding spool (369) is provided with a first opening section (383) that is allowed to selectively communicate with the plurality of intake ports ($P_{11}$, $P_{12}$) and a second opening section (385) that communicates with the connection passage (387) of the valve main body (365), and the second sliding spool (371) is provided with a hollow pressure fluid flow-in chamber (389) and a pressure fluid discharge chamber (391), and the pressure fluid flow-in chamber (389) is provided with a third opening section (393) that communicates with the connection passage (387) and a fourth opening section (395) that is allowed to selectively communicate with a descent port (A) and a rise port (B) that respectively communicates with the upper chamber (351) and the lower chamber (335) of the cylinder (349), and the pressure fluid discharge chamber (391) is provided with a fifth opening section (397) that is allowed to selectively communicate with a discharge-side lowering port ($T_A$) and a discharge-side rise port ($T_B$) that respectively communicates with a lower oil drain port and an upper oil drain port that are respectively located at the upper chamber (351) and the lower chamber (355) of the cylinder (349), and a sixth opening section (399) that communicates with an oil drain port (T) that connects to an oil tank (329).

9. A rotary servo valve comprising:
- a valve main body (303) provided with a plurality of intake ports ($P_{11}$, $P_{12}$) for taking in a plurality of pressure fluids which have pressures different to one another and a plurality of supply ports (A, B) for supplying a plurality of pressure fluids taken in to the desired drives;
- a rotating spool (307) that has a hollow, and is installed to be inserted into the valve main body (303) while being free to rotate, and selectively allows one of the plurality of intake ports ($P_{11}$, $P_{12}$) to communicate with the hollow;
- a rotating actuator (313) for rotating the rotating spool (307);
- a sliding spool (371) that has a hollow, and is installed to be inserted into the valve main body (303) while being free to reciprocate, and selectively allows one of the plurality of supply ports (A, B) to communicate with the hollow; and
- a sliding actuator (377) for rotating the sliding spool (371),
- wherein the valve main body (303) has a connection passage (339) that interconnects pressure fluids in the hollows of the sliding spool (371) and the rotating spool (307).

10. The rotary servo valve according to claim 9, wherein the plurality of intake ports ($P_{11}$, $P_{12}$) includes a high-pressure opening ($P_{12}$) for taking in high-pressure fluid and a low-pressure opening ($P_{11}$) for taking in low-pressure fluid, and the plurality of supply ports (A, B) includes a descent port (A) for supplying pressure fluid to the upper chamber (351) of the cylinder (349) operated by the pressure fluid and a rise port (B) for supplying pressure fluid to the lower chamber (355) of the cylinder (349).

11. The rotary servo valve according to claim 9, wherein a hollow wall of the rotating spool (307) is provided with a first opening section (323) that is allowed to selectively communicate with the plurality of intake ports ($P_{11}$, $P_{12}$) and a second opening section (325) that communicates with the connection passage (339) of the valve main body (303), and the sliding spool (371) is provided with a hollow pressure fluid flow-in chamber (389) and a pressure fluid discharge chamber (391), and the pressure fluid flow-in chamber (389) is provided with a third opening section (393) that communicates with the connection passage (339) and a fourth opening section (395) that is allowed to selectively communicate with a descent port (A) and a rise port (B) that respectively communicates with the upper chamber (351) and the lower chamber (335) of the cylinder (349), and the pressure fluid discharge chamber (391) is provided with a fifth opening section (397) that is allowed to selectively communicate with a discharge-side descent port ($T_A$) and a discharge-side rise port ($T_B$) that respectively communicates with the descent port (A) and the rise port (B) through first and second connection passages (401A, 401B) and a sixth opening section (399) that communicates with an drain oil port (T) that connects to an oil tank (329).

12. The rotary servo valve according to claim 9, wherein a hollow wall of the rotating spool (307) is provided with a first opening section (323) that is allowed to selectively communicate with the plurality of intake ports ($P_{11}$, $P_{12}$) and a second opening section (325) that communicates with the connection passage (339) of the valve main body (303), and the sliding spool (371) is provided with a hollow pressure fluid flow-in chamber (389) and a pressure fluid discharge chamber (391), and the pressure fluid flow-in chamber (389) is provided with a third opening section (393) that communicates with the connection passage (339) and a fourth opening section (395) that is allowed to selectively communicate with a descent port (A) and a rise port (B) that respectively communicates with the upper chamber (351) and the lower chamber (335) of the cylinder (349), and the pressure fluid discharge chamber (391) is provided with a fifth opening section (397) that is allowed to selectively communicate with a discharge-side descent port ($T_A$) and a discharge-side rise port ($T_B$) that respectively communicates with a lower oil drain port and an upper oil drain port that are respectively located at the upper chamber (351) and the lower chamber (355) of the cylinder (349), and a sixth opening section (399) that communicates with an oil drain port (T) that connects to an oil tank (329).

* * * * *